(12) United States Patent
Swanson et al.

(10) Patent No.: US 10,682,830 B2
(45) Date of Patent: *Jun. 16, 2020

(54) SUCCESSIVELY PEELABLE COEXTRUDED POLYMER FILM WITH EMBEDDED ANTIMICROBIAL LAYER(S)

(71) Applicant: 3M INNOVATIVE PROPERTIES COMPANY, St. Paul, MN (US)

(72) Inventors: Steven P. Swanson, Blaine, MN (US); Semra Colak Atan, St. Louis Park, MN (US); Onur S. Yordem, St. Paul, MN (US); Stephen A. Johnson, Woodbury, MN (US); Timothy J. Lindquist, Woodbury, MN (US); Terence D. Neavin, Minneapolis, MN (US); Matthew T. Scholz, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 365 days.

This patent is subject to a terminal disclaimer.

(21) Appl. No.: 14/892,096

(22) PCT Filed: Jun. 2, 2014

(86) PCT No.: PCT/US2014/040438
§ 371 (c)(1),
(2) Date: Nov. 18, 2015

(87) PCT Pub. No.: WO2014/197344
PCT Pub. Date: Dec. 11, 2014

(65) Prior Publication Data
US 2016/0089858 A1 Mar. 31, 2016

Related U.S. Application Data

(60) Provisional application No. 61/831,939, filed on Jun. 6, 2013.

(51) Int. Cl.
*B32B 7/06* (2019.01)
*B32B 27/08* (2006.01)
(Continued)

(52) U.S. Cl.
CPC .................. *B32B 7/06* (2013.01); *B32B 3/02* (2013.01); *B32B 3/06* (2013.01); *B32B 3/266* (2013.01);
(Continued)

(58) Field of Classification Search
CPC .......... B32B 7/06; B32B 3/266; B32B 27/32; B32B 27/36; B32B 27/08; B32B 27/18;
(Continued)

(56) References Cited

U.S. PATENT DOCUMENTS

| 4,770,320 A | 9/1988 | Miles et al. |
| 4,907,825 A | 3/1990 | Miles et al. |

(Continued)

FOREIGN PATENT DOCUMENTS

| EP | 1312470 | 5/2003 |
| EP | 1844746 | 10/2007 |

(Continued)

OTHER PUBLICATIONS

Joespy Dooley and Harvey Tung, "Encyclopedia of Polymer Science and Technology," vol. 2, pp. 1-25, Oct. 25, 2001 (Year: 2001).*

(Continued)

*Primary Examiner* — Michael Zhang

(57) ABSTRACT

Multilayered polymer films are configured so that successive constituent layer packets can be delaminated in continuous sheet form from the remaining film. The films are compatible with known coextrusion manufacturing techniques, and can be made without adhesive layers between layer packets that are tailored to be individually peelable from the remainder of the film. Instead, combinations of polymer composi- (Continued)

tions are used to allow non-adhesive polymer layers to be combined such that irreversible delamination of the film is likely to occur at interfaces between layer packets pairs. Some of the polymer layers, including at least one embedded layer, comprise an antimicrobial agent, and these layers may be positioned at the front of each layer packet. After the antimicrobial layer of one layer packet has been used, the packet can be peeled away to expose a pristine antimicrobial layer of the next layer packet. The antimicrobial agent may be organic.

22 Claims, 6 Drawing Sheets

(51) Int. Cl.
| | |
|---|---|
| B32B 27/18 | (2006.01) |
| B32B 3/06 | (2006.01) |
| B32B 3/02 | (2006.01) |
| B32B 3/26 | (2006.01) |
| B32B 27/32 | (2006.01) |
| B32B 27/36 | (2006.01) |
| B32B 38/10 | (2006.01) |
| A01N 25/34 | (2006.01) |

(52) U.S. Cl.
CPC .............. *B32B 27/08* (2013.01); *B32B 27/18* (2013.01); *B32B 27/32* (2013.01); *B32B 27/36* (2013.01); *B32B 38/10* (2013.01); *A01N 25/34* (2013.01); *B32B 2250/24* (2013.01); *B32B 2250/42* (2013.01); *B32B 2307/42* (2013.01); *B32B 2307/7145* (2013.01); *B32B 2307/748* (2013.01); *B32B 2307/756* (2013.01); *B32B 2457/20* (2013.01)

(58) Field of Classification Search
CPC .. B32B 38/10; B32B 3/06; B32B 3/02; B32B 2250/24; B32B 2250/42; B32B 2307/748; B32B 2307/756; B32B 2307/42; B32B 2307/7145; B32B 2457/20; A01N 25/34
See application file for complete search history.

(56) References Cited

U.S. PATENT DOCUMENTS

| | | | |
|---|---|---|---|
| 4,946,743 A * | 8/1990 | Winter ................... | B32B 27/08 428/349 |
| 5,208,257 A | 5/1993 | Kabara | |
| 5,427,842 A | 6/1995 | Bland et al. | |
| 5,592,698 A | 1/1997 | Woods | |
| 5,604,019 A | 2/1997 | Bland et al. | |
| 5,867,316 A | 2/1999 | Carlson et al. | |
| 5,919,547 A | 7/1999 | Kocher et al. | |
| 5,997,968 A | 12/1999 | Dries et al. | |
| 6,179,948 B1 | 1/2001 | Merrill et al. | |
| 6,461,709 B1 * | 10/2002 | Janssen ................... | B32B 7/06 428/41.7 |
| 6,742,522 B1 | 6/2004 | Baker et al. | |
| 6,762,339 B1 | 7/2004 | Klun et al. | |
| 7,104,776 B2 | 9/2006 | Merrill et al. | |
| 7,153,122 B2 | 12/2006 | Jackson et al. | |
| 7,153,123 B2 | 12/2006 | Jackson et al. | |
| 7,345,137 B2 | 3/2008 | Hebrink et al. | |
| 7,879,746 B2 | 2/2011 | Klun et al. | |
| 8,198,326 B2 | 6/2012 | Scholz | |
| 8,391,934 B1 | 3/2013 | Chan et al. | |
| 2002/0068182 A1* | 6/2002 | Kelch ................... | B32B 27/08 428/463 |
| 2003/0064181 A1 | 4/2003 | Ingraham | |
| 2003/0068514 A1 | 4/2003 | Sperlich et al. | |
| 2004/0042441 A1 | 3/2004 | Adrangi et al. | |
| 2004/0121105 A1* | 6/2004 | Janssen ................... | B32B 7/06 428/40.1 |
| 2004/0115457 A1 | 7/2004 | Kong | |
| 2004/0151932 A1 | 8/2004 | Galloway | |
| 2005/0000642 A1* | 1/2005 | Everaerts ................... | C09J 7/22 156/273.1 |
| 2005/0008802 A1 | 1/2005 | Malfait et al. | |
| 2005/0042441 A1 | 2/2005 | Peiffer et al. | |
| 2005/0058673 A1 | 3/2005 | Scholz et al. | |
| 2005/0129929 A1 | 6/2005 | Patton et al. | |
| 2005/0129937 A1* | 6/2005 | Patton ................... | A01N 25/34 428/354 |
| 2005/0249791 A1* | 11/2005 | Hobbs ................... | A01N 25/34 424/443 |
| 2006/0051384 A1 | 3/2006 | Scholz et al. | |
| 2006/0051385 A1 | 3/2006 | Scholz | |
| 2006/0052452 A1 | 3/2006 | Scholz | |
| 2006/0093809 A1 | 5/2006 | Hebrink et al. | |
| 2006/0108050 A1 | 5/2006 | Satake et al. | |
| 2006/0159888 A1 | 7/2006 | Hebrink et al. | |
| 2006/0227421 A1 | 10/2006 | Stover et al. | |
| 2006/0228092 A1* | 10/2006 | Hebrink ................... | B32B 3/26 385/147 |
| 2006/0228592 A1* | 10/2006 | Stover ................... | G02B 1/04 428/523 |
| 2007/0286878 A1* | 12/2007 | Harruna ................... | A01N 25/34 424/405 |
| 2009/0130157 A1* | 5/2009 | Ylitalo ................... | A01N 25/34 424/405 |
| 2010/0104791 A1 | 4/2010 | Baudrion et al. | |
| 2010/0247824 A1* | 9/2010 | Chang ................... | A61J 1/10 428/35.7 |
| 2010/0291396 A1 | 11/2010 | Peiffer et al. | |
| 2011/0076452 A1 | 3/2011 | Sakagami et al. | |
| 2011/0200778 A1 | 8/2011 | Ibbotson | |
| 2011/0217752 A1 | 9/2011 | Rasmussen et al. | |
| 2011/0244000 A1* | 10/2011 | Gorin ................... | A01N 25/34 424/400 |
| 2011/0272832 A1 | 11/2011 | Neavin | |
| 2011/0272849 A1 | 11/2011 | Neavin et al. | |
| 2013/0088783 A1 | 4/2013 | Liu et al. | |
| 2013/0142975 A1* | 6/2013 | Wallace ................... | B32B 1/02 428/36.7 |
| 2014/0065397 A1 | 3/2014 | Johnson et al. | |
| 2019/0248117 A1* | 8/2019 | Johnson ................... | B29C 55/12 |

FOREIGN PATENT DOCUMENTS

| | | |
|---|---|---|
| JP | 04314537 | 11/1992 |
| JP | 6143496 | 5/1994 |
| JP | H06285946 | 10/1994 |
| JP | 2010194781 | 9/2010 |
| JP | 2012027260 | 2/2012 |
| WO | WO 01/94292 | 12/2001 |
| WO | WO 02/055301 | 7/2002 |
| WO | WO 02/087328 | 11/2002 |
| WO | WO 03/013454 | 2/2003 |
| WO | WO 03/034842 | 5/2003 |
| WO | WO 2009/105427 | 8/2009 |
| WO | WO 2010/015402 | 2/2010 |
| WO | WO 2011/008655 | 1/2011 |
| WO | WO 2012/092478 | 7/2012 |

OTHER PUBLICATIONS

"3M™ Scotchgard™ Multi-Layer Protective Film brochure," "Industrial Adhesives and Tapes Division," 2 pages.
Kabara, "Food-Grade Chemicals for Use in Designing Food Preservative Systems," "Journal of Food Protection," Aug. 1981, vol. 44, No. 8, pp. 633-647.
Kabara, "A New Preservative System for Food," "*Journal of Food Safety*," Jun. 1982, No. 4, pp. 13-25.
Block, "Disinfection, Sterilization and Preservation," No. 4, Chapter 13, pp. 225-255 (1991).
Shaver, "Film Birds," "Window Film," Mar./Apr. 2005, vol. 9, No. 2, (printed Mar. 7, 2012), [retrieved from the internet on Jan. 4,

(56) References Cited

OTHER PUBLICATIONS

2016], URL http://www.glass.com/Window_film/BlackIssues/205/MarchApril%202005/FilmBirds.html, pp. 1-4

ProShield tear-offs, (printed Mar. 7, 2012), [retrieved from the internet on Jan. 4, 2016], URL http://shop.protint.com/ProShield-Tear-Offs_c2.html, 1 page.

International Search report for PCT International Application No. PCT/US2014/040438 dated Sep. 22, 2014, 4 pages.

* cited by examiner ns, with
SUCCESSIVELY PEELABLE COEXTRUDED POLYMER FILM WITH EMBEDDED ANTIMICROBIAL LAYER(S)

CROSS REFERENCE TO RELATED APPLICATIONS

This application is a national stage filing under 35 U.S.C. 371 of PCT/US2014/040438, filed Jun. 2, 2014, which claims priority to United States Provisional Application No. 61/831,939, filed Jun. 6, 2013, the disclosures of which are incorporated by reference in their entireties herein.

FIELD OF THE INVENTION

This invention relates generally to polymer films, with particular application to such films having a multi-layered construction in which individual layers or groups of layers can be peeled apart or delaminated from the remainder of the construction. The invention also relates to associated articles, systems, and methods.

BACKGROUND

Polyester films (this term includes co-polyester and polyester blend, alloy, and mixture films) have been heavily utilized over the last several decades in a great variety of applications. Oriented polyester film products have been produced as roll goods in both monolayer and coextruded multilayered formats. Frequently, protective liner films (also referred to as premasks) are applied to one or both outer surfaces of such films for protective purposes. The liner film typically provides only a temporary protective function while the useful polyester film it is attached to is in transit between manufacturing facilities and/or to the customer, or being handled or processed. The liner film is designed to be removed by an in-house converting process or by the customer before or upon converting or installation of the useful polyester film by simply peeling the liner film, in sheet form, away from the useful polyester film, and then discarding or recycling the liner film. The liner film typically does not provide any functionality comparable to that of the useful polyester film. For example, if the useful polyester film is an optical polarizing film, the liner film does not provide any meaningful optical functionality or polarizing functionality.

It is also known to design some multilayered polymer films so that constituent layers or sheets, each with similar functionality, can be peeled apart or delaminated from the remainder of the film. One use for such films is in anti-graffiti applications. In such applications, the film in its original form may be applied to a mirror, window, or other item to be protected. The film is made up of highly transparent polymer materials, so that the appearance of the mirror, window, or other item is minimally affected by the film. If graffiti is applied to the exposed surface of the film, an outermost portion of the film, on which the graffiti resides, can be peeled away in continuous sheet form from the remainder of the film. After removal of the outermost portion, the remaining film stays in place on the item, which now appears clean and graffiti-free again. A portion of the film that was originally interior to the film, immediately beneath the outermost portion, becomes the new outermost layer. If graffiti is again applied, the new graffiti will reside on the exposed surface of the new outermost layer. The new graffiti can be removed by peeling away the new outermost layer in continuous sheet form from the remainder of the film. After removal of the new outermost portion, the remaining film stays in place on the item, which again appears clean and graffiti-free. The original film product can be made with up to 4 constituent sheets that can be sequentially removed in this manner to provide protection against repeated acts of defacement. To facilitate removal of only one sheet at a time, the product is made with kiss-cut tab-like features of differing depths near the edge of the film.

BRIEF SUMMARY

Known multilayered polymer films designed for delamination are typically made by first manufacturing the constituent sheets, and then laminating the sheets together with pressure sensitive adhesive (PSA) layers. This manufacturing approach, and film design, introduces inherent limitations in the types of films that can be made. For example, the constituent sheets need to be physically thick enough to allow the individual sheets to be processed by automated film-handling equipment without excessive tears or breakage. This places a lower limit on the thickness of the individual sheets, and a concomitant upper limit on the number of such sheets that can be laminated together to form a multilayered film that is sufficiently thin and flexible. Also, laminating sheets together that were manufactured separately tends to expose the sheets to contamination.

We have developed a new family of multilayered polymer films that are configured so that successive constituent layer packets can be delaminated in continuous sheet form from the remaining film. Here, a layer packet refers to a plurality of individual layers that are bonded to each other and that function or act like a single sheet for purposes of delamination. The new films are preferably compatible with known coextrusion manufacturing techniques to permit the layer packets to be much thinner than if a lamination manufacturing technique were used. Also, by joining the layers together in a single coextruding process, typically at elevated temperature, the potential for contaminating the interfaces between the layers is greatly reduced. Some of the polymer layers, including at least one embedded layer, comprise an antimicrobial agent, e.g. an organic antimicrobial agent. After the antimicrobial layer of an outermost layer packet has served its useful purpose, that packet can be simply peeled away to expose a pristine antimicrobial layer of the next layer packet. In this way, by applying the multilayered polymer film to a mobile phone, touch screen display, or any other workpiece of interest, e.g., one that is touched or otherwise contaminated frequently and that may contribute to the spread of germs or other microbes (including in particular high touch surfaces in hospital, healthcare facility, or food preparation settings), relative cleanliness of the workpiece can be maintained over an extended period of time.

The new films are also preferably made without the use of adhesive layers between layer packets that are tailored to be individually peelable from the remainder of the film. (An adhesive layer in this regard refers to a layer that is tacky at room temperature.) Instead, combinations of polymer compositions are used that allow non-adhesive polymer layers to be combined in such a way that delamination of the film is likely to occur along a plurality of delamination surfaces corresponding to interfaces between adjacent layer packets. In some cases, the peel strength at the delamination surfaces is lower than the peel strength at other layer interfaces within the film. The absence of an adhesive between peelable layer packets results in the delamination being irreversible: after a layer packet is delaminated from the remainder of the film, the layer packet cannot thereafter be permanently or reliably re-affixed to the film simply by pressing the delaminated layer packet against the film.

We describe herein, inter alia, films that comprise a stack of polymer layers, the polymer layers being organized into layer packets, each of the layer packets having at least two of the polymer layers. Attachment between adjacent layer packets is weak enough to permit the layer packets to be separately irreversibly delaminated from a remainder of the stack, and the stack is configured to promote such irreversible delamination between such layer packets rather than within the layer packets. All of the polymer layers in the stack of polymer layers have respective polymer compositions that are coextrudable with each other. Furthermore, at least some of the polymer layers comprise one or more antimicrobial agent, e.g., an organic antimicrobial agent.

Each layer packet in the stack may include at least one polymer layer that comprises the antimicrobial agent. The antimicrobial agent may include a first antimicrobial agent, and the at least one polymer layer in each layer packet that comprises the antimicrobial agent may comprise the first antimicrobial agent. For each layer packet in the stack, the at least one polymer layer comprising the antimicrobial agent may be disposed at a front of such layer packet. Each layer packet in the stack may further include at least one polymer layer that comprises substantially no antimicrobial agent. Each layer packet may have only one polymer layer that comprises the antimicrobial agent. The at least some polymer layers comprising the antimicrobial agent may include an interior polymer layer, and the interior polymer layer may be bounded by polymer layers that retard or resist migration of the antimicrobial agent. The at least some polymer layers comprising the antimicrobial agent may include a plurality of interior polymer layers, and each interior polymer layer may be bounded by polymer layers that retard or resist migration of the antimicrobial agent.

An attachment between any two adjacent layer packets may be characterized by a peel force in a range from 2 to 100 grams per inch (0.8 to 38.6 N/m). The stack may be configured with access tabs that provide access to interfaces between adjacent layer packets. The access tabs may be defined by a set of kiss-cut holes of different depths. The polymer layers may be arranged in a repeating AB sequence. The polymer layers may alternatively be arranged in a repeating ABC sequence.

The stack may be configured such that for every pair of adjacent layer packets in the stack, attachment between the layer packets is weaker than attachment between the polymer layers within the layer packets, such that irreversible delamination tends to occur between the layer packets rather than within the layer packets. An attachment between adjacent layer packets may be characterized by a first peel force, and an attachment of polymer layers within each layer packet may be characterized by a second peel force, and the second peel force may be at least two times the first peel force.

The polymer layers may be arranged in a repeating ABC sequence, and attachment between polymer layers A and C may be weaker than attachment between polymer layers A and B, and may also be weaker than attachment between polymer layers B and C.

The antimicrobial agent may be organic, and may comprise one or more antimicrobial lipid, antimicrobial essential oil, biguanide (including without limitation one or more polymeric biguanide and/or bis(biguanide)), phenolic compound, cationic amine compound, and/or organo-tin compound. The organic antimicrobial agent may comprise an antimicrobial lipid comprising a fatty acid monoester. The fatty acid monoester may comprise glycerol monolaurate. The fatty acid monoester is at least 85%, or at least 90%, or at least 95% pure.

All of the polymer layers in the stack of polymer layers may have respective polymer compositions that are melt processable at a melt temperature of 204 degrees C. (400 degrees F.) or greater. At least some of the polymer layers in the stack may be oriented and have a birefringence of at least 0.05 after stretching. The stack may be configured such that none of the polymer layers that are disposed at interfaces of adjacent layer packets are tacky at room temperature.

Each of the layer packets in the stack may have a thickness of no more than 2 mils (50 microns). The polymer layers may be organized into at least N layer packets, where N is at least 5. N may be at least 10, and the film may have an overall thickness of no more than 15 mils (380 microns).

We also disclose combinations of the disclosed antimicrobial films with other articles, e.g. articles having "high touch" surfaces—i.e., surfaces that are likely to be touched frequently. In one combination, an electronic device comprises a display, and the film is attached to the display.

The films may be highly transmissive to visible light, or in some cases they may have a (lower) intermediate optical transmission, or they may have a low optical transmission, e.g. they may be opaque. For high transmission films, the films may also be made to have low optical haze to allow for clear viewing of objects located behind the film. The stack of polymer layers may for example have an average transmission over visible wavelengths of at least 80%, and an optical haze of less than 15%, or an optical haze of less than 8%.

The stack of polymer layers may include markings that indicate how many layer packets are present in the film. The markings may include non-overlapping holes of different depths through the stack of polymer layers.

We also disclose methods that relate to the disclosed films. For example, a method may include providing a multilayered polymer film comprising a stack of polymer layers, the polymer layers being organized into layer packets, each of the layer packets having at least two of the polymer layers, attachment between adjacent layer packets being weak enough to permit the layer packets to be separately irreversibly delaminated from a remainder of the stack, some of the polymer layers comprising one or more antimicrobial agent (such as an organic antimicrobial agent), all of the polymer layers in the stack of polymer layers having respective polymer compositions that are coextrudable with each other, and the layer packets may include a first layer packet comprising a first polymer layer comprising the one or more antimicrobial agent and a second layer packet comprising a second polymer layer comprising the one or more antimicrobial agent. The method may further include providing a workpiece, and attaching the multilayered polymer film to the workpiece such that the first polymer layer is exposed to contact by users and the second polymer layer is interior to the stack of polymer layers and not substantially exposed to contact by users. The method may further include peeling away the first layer packet while a remainder of the stack of polymer layers remains attached to the workpiece, to expose the second polymer layer of the second layer packet to contact by users. Before the peeling away, the second polymer layer may be exposed to contact by users only over a minor portion (e.g., no more than 10%, or 5%, or 2%) of its surface, and such minor portion may correspond to an access tab region.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1A:
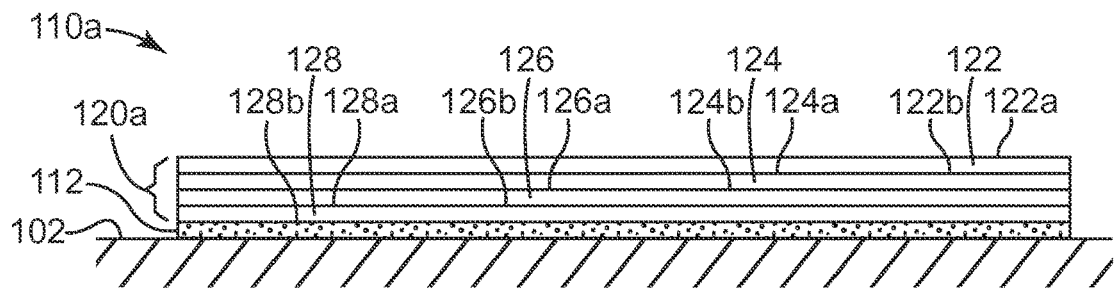
FIG. 1A is a schematic side or sectional view of a polymer film applied to a workpiece, the polymer film configured for successive irreversible delamination.

We have developed new multilayered polymer films that incorporate antimicrobial polymer layers, including at least one, and typically many more than one, antimicrobial polymer layer that is initially interior to the film rather than being at an exposed outer surface. The film is configured so that layer packets can be delaminated or peeled away, one layer packet at a time with each layer packet functioning as a continuous sheet, from the remaining film in a controlled manner. The antimicrobial layers can furthermore be arranged within the film so that upon the initial application of the film to a workpiece, an outermost polymer layer of a first layer packet contains an antimicrobial agent and thus functions to limit the growth of germs or other microbes that may be deposited on the surface, e.g. by repeated touchings. After that layer has served its useful purpose, the workpiece can be renewed or refreshed by simply delaminating and peeling away the (initially outermost) first layer packet to expose a second layer packet which contains its own antimicrobial polymer layer. The antimicrobial polymer layer of the second layer packet, which was originally interior to the polymer film and protected from contamination by the first layer packet, becomes exposed to the environment as the new outermost layer after delamination of the first layer packet. Immediately after removal of the first layer packet, the antimicrobial polymer layer of the second layer packet is initially clean and pristine because of the protection from contamination that was provided by the first layer packet. Similar to the antimicrobial polymer layer of the first layer packet, the antimicrobial polymer layer of the second layer packet functions to limit the growth of germs or other microbes that may be deposited on the surface. Eventually, the antimicrobial polymer layer of the second layer packet reaches the end of its useful life, whereupon, depending on the film design, the workpiece may be renewed yet again by delaminating and peeling away the second layer packet to expose a pristine antimicrobial polymer layer of a third layer packet, and thereafter delaminating and peeling away the third layer packet to expose a pristine antimicrobial polymer layer of a fourth layer packet, and so forth.

An antimicrobial agent in this regard refers to a composition, compound, material, substance, treatment, or other agent that kills or inhibits the growth of one or more germs, bacteria (including Gram-positive and/or Gram-negative bacteria), viruses, pathogens, fungi, or other microorganisms. The antimicrobial agent may thus be or comprise any antibacterial agent, bacteriostatic agent, microbicide, antifungal agent, or disinfectant, whether now known or later developed. Exemplary antimicrobial agents are capable of being dispersed within a polymer material or polymer precursor material, and are compatible with process temperatures and other conditions encountered during coextrusion. Exemplary antimicrobial agents lose less than 10% of their weight when analyzed by thermal gravimetric analysis (TGA) heated under inert atmosphere at 10° C./min up to a temperature of 200° C., or up to a temperature of 225° C., or up to a temperature of 250° C.

Antimicrobial agents may be organic or inorganic. One exemplary organic antimicrobial agent is glycerol monolaurate (which is a $C_{12}$ fatty acid monoglyceride), and/or other $C_8$ to $C_{12}$ fatty acid monoglycerides. A product comprising glycerol monolaurate is sold under the trade name Lauricidin by Clearsynth Labs Pvt. Ltd., Mumbai, India. A candidate for use as an inorganic antimicrobial agent is a silver salt, e.g., active silver ion included in a suitable carrier. The antimicrobial agent(s) may in some cases be present in a given polymer layer to provide a sufficient antimicrobial activity as set forth in American Association of Textile and Color Chemists (AATCC) Test Method 100-1993 (AATCC Technical Manual, 1997, pp. 143 to 144), or Japanese Industrial Standard (JIS) Z 2801: 2010. Additional discussion of antimicrobial materials is provided in U.S. Pat. No. 6,762,339 (Klun et al.).

If the antimicrobial agent is organic, it may be or comprise one or more antimicrobial lipid, antimicrobial essential oil, biguanide (including without limitation one or more polymeric biguanide and/or bis(biguanide)), phenolic compound, cationic amine compound, and/or organo-tin compound, or combinations thereof. The antimicrobial lipid may be a fatty acid monoester, which may comprise glycerol monolaurate. The fatty acid monoester is desirably at least 85%, or at least 90%, or at least 95% pure.

An antimicrobial lipid component may be or include one or more fatty acid esters of a polyhydric alcohol, fatty ethers of a polyhydric alcohol, or alkoxylated derivatives thereof (of either or both of the ester and ether), or combinations thereof. More specifically and desirably, the antimicrobial component may be selected from the group consisting of a $(C_7-C_{12})$ saturated fatty acid ester of a polyhydric alcohol, a $(C_{12}-C_{22})$ unsaturated fatty acid ester of a polyhydric alcohol, a $(C_7-C_{12})$ saturated fatty ether of a polyhydric alcohol, a $(C_{12}-C_{22})$ unsaturated fatty ether of a polyhydric alcohol, an alkoxylated derivative thereof, and combinations thereof. The esters and ethers may be monoesters and monoethers, unless they are esters and ethers of sucrose in which case they can be monoesters, diesters, monoethers, or monoethers. Various combinations of monoesters, diesters, monoethers, and diethers can also be used. Further discussion of such materials can be found in patent application publication US 2005/0058673 (Scholz et al.).

The $(C_7-C_{12})$ saturated and $(C_{12}-C_{22})$ unsaturated monoesters and monoethers of polyhydric alcohols may be at least 80% pure (having 20% or less diester and/or triester or diether and/or triether), or at least 85% pure, or at least 90% pure, or even at least 95% pure. Impure esters or ethers may not have sufficient, if any, antimicrobial activity.

An antimicrobial essential oil may be or include natural oil derived antiseptics, which class may include: oils and oil extracts from plants such as Tea Tree oil, grape fruit seed extract, Aspidium extract (phloro, lucinol containing extract), barberry extract (berberine chloride), bay sweet extract, bayberry bark extract (myricitrin), cade oil, CAE (available from Ajinomoto, located in Teaneck, N.J.), cajeput oil, caraway oil, cascarilla bark (sold under the trade designation ESSENTIAL OIL), cedarleaf oil, chamomile, cinnamon oil, citronella oil, clove oil, German chamomile oil, giant knotweed, lemon balm oil, lemon grass, olive leaf extract (available from Bio Botanica), parsley, patchouli oil, peony root, pine needle oil, PLANSERVATIVE (available from Campo Research), rose geranium oil, rosemary, sage, and the like, as well as mixtures thereof. Of particular note are tea tree oil (cajeput oil) and grapefruit seed extract. Further discussion of such materials can be found in patent application publication US 2006/0051384 (Scholz et al.).

A phenolic compound may be or include a phenolic antiseptic, including but not limited to: diphenyl ethers, such as the polyhalogenated hydroxy diphenyl ethers, more specifically those containing multiple halogen substituents; simple phenolics, such as phenol, cresol, o-phenylphenol, 4-hexylresorcinol; and the halogenated phenolics, such as p-chlorometa-xylenol, dichlorometa-xylenol, o-benzyl p-chlorophenol and p-isoamylphenol; bisphenolics, e.g., 2,2'-methylene bis (3,4,6-trichlorophenol), 2,2'-methylene bis (4,6-dichlorophenol), 2,2'-methylene bis (4-chlorophenol), 2,2'-thio bis (4,6-dichlorophenol); and anilides, e.g., salicylanilide, monohalogenated salicylanilide, and polyhalogenated salicylanilide. Further discussion of such materials can be found in patent application publication US 2006/0052452 (Scholz).

A cationic amine compound may be or include one or more biguanides and bisbiguanides such as chlorhexidine and its various salts including but not limited to the digluconate, diacetate, dimethosulfate, and dilactate salts, and combinations thereof, polymeric biguanide compounds such as polyhexamethylenebiguanide as well as polymeric biguanides disclosed in patent application publication US 2011/0217752 (Rasmussen et al.), silver and various silver complexes, small molecule quaternary ammonium compounds such as benzalkoium chloride and alkyl substituted derivatives, di-long chain alkyl ($C_8-C_{18}$) quaternary ammonium compounds, cetylpyridinium halides and their derivatives, benzethonium chloride and its alkyl substituted derivatives, octenidine, and compatible combinations thereof. Further discussion of such materials can be found in patent application publication US 2006/0051385 (Scholz).

Useful fatty acid esters of a polyhydric alcohol may have the formula:

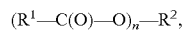

$$(R^1-C(O)-O)_n-R^2,$$

wherein $R^1$ is the residue of a $(C_7-C_{12})$ saturated fatty acid (for example, a $(C_8-C_{12})$ saturated fatty acid), or a $(C_8-C_{22})$ unsaturated (for example, a $(C_{12}-C_{22})$ unsaturated, including polyunsaturated) fatty acid, $R^2$ is the residue of a polyhydric alcohol (typically and preferably, glycerin, propylene glycol, and sucrose, although a wide variety of others can be used including pentaerythritol, sorbitol, mannitol, xylitol, etc.), and n=1 or 2. The $R^2$ group includes at least one free hydroxyl group (for example, residues of glycerin, propylene glycol, or sucrose). Exemplary fatty acid esters of polyhydric alcohols are esters derived from $C_7$, $C_8$, $C_9$, $C_{10}$, $C_{11}$, and $C_{12}$ saturated fatty acids. For embodiments in which the polyhydric alcohol is glycerin or propylene glycol, n=1, although when it is sucrose, n=1 or 2. In general, monoglycerides derived from $C_{10}$ to $C_{12}$ fatty acids are food grade materials and GRAS materials.

Fatty acid esters are particularly useful candidates for treating food, and surfaces exposed to food, to reduce the number of human pathogens and spoilage in food since many of the monoesters have been reported to be food grade, generally recognized as safe (GRAS) materials, and have been reported to be effective as food preservatives and topical pharmaceutical agents. For example, Kabara, J. of *Food Protection*, 44:633-647 (1981) and Kabara, J. of *Food Safety*, 4:13-25 (1982) report that LAURICIDIN (the glycerol monoester of lauric acid commonly referred to as monolaurin), a food grade phenolic and a chelating agent, may be useful in designing food preservative systems.

Fatty acid monoesters, such as glycerol monoesters of lauric, caprylic, capric, and heptanoic acid and/or propylene glycol monoesters of lauric, caprylic, capric and heptanoic acid, are active against Gram positive bacteria, fungi, yeasts, and lipid coated viruses, but alone are not generally active against Gram negative bacteria. When the fatty acid monoesters are combined with the enhancers described below, the composition is active against Gram negative bacteria.

Certain types of antimicrobial components (e.g. fatty acid monoesters) may plasticize the polymer film. Exemplary fatty acid monoesters include, but are not limited to, glycerol monoesters of lauric (monolaurin), caprylic (monocaprylin), and capric (monocaprin) acid, and propylene glycol monoesters of lauric, caprylic, and capric acid, as well as lauric, caprylic, and capric acid monoesters of sucrose. Other fatty acid monoesters include glycerin and propylene glycol monoesters of oleic (18:1), linoleic (18:2), linolenic (18:3), and arachonic (20:4) unsaturated (including polyunsaturated) fatty acids. As is generally known, 18:1, for example, means the compound has 18 carbon atoms and 1 carbon-carbon double bond. Exemplary unsaturated chains have at least one unsaturated group in the cis isomer form. In certain embodiments, the fatty acid monoesters may include known monoesters of lauric, caprylic, and capric acid, such as that known as GML or the trade designation LAURICIDIN (the glycerol monoester of lauric acid commonly referred to as monolaurin or glycerol monolaurate), glycerol monocaprate, glycerol monocaprylate, propylene glycol monolaurate, propylene glycol monocaprate, propylene glycol monocaprylate, and combinations thereof.

Exemplary fatty acid diesters of sucrose include, but are not limited to, lauric, caprylic, and capric diesters of sucrose as well as combinations thereof.

An exemplary fatty ether of a polyhydric alcohol is of the formula:

$$(R^3-O)_n-R^4,$$

wherein $R^3$ is a ($C_7$-$C_{12}$) saturated aliphatic group (for example, a ($C_8$-$C_{12}$) saturated aliphatic group), or a ($C_8$-$C_{22}$) unsaturated (for example, ($C_{12}$-$C_{22}$) unsaturated, including polyunsaturated) aliphatic group, $R^4$ is the residue of a polyhydric alcohol. Exemplary polyhydric alcohols include glycerin, sucrose, or propylene glycol. For glycerin and propylene glycol n=1, and for sucrose n=1 or 2. Exemplary fatty ethers are monoethers of ($C_7$-$C_{12}$) alkyl groups (more preferably, ($C_8$-$C_{12}$) alkyl groups).

Exemplary fatty monoethers include, but are not limited to, laurylglyceryl ether, caprylglycerylether, caprylylglyceryl ether, laurylpropylene glycol ether, caprylpropyleneglycol ether, and caprylylpropyleneglycol ether. Other fatty monoethers include glycerin and propylene glycol monoethers of oleyl (18:1), linoleyl (18:2), linolenyl (18:3), and arachonyl (20:4) unsaturated and polyunsaturated fatty alcohols. In certain exemplary embodiments, the fatty monoethers include laurylglyceryl ether, caprylglycerylether, caprylyl glyceryl ether, laurylpropylene glycol ether, caprylpropyleneglycol ether, caprylylpropyleneglycol ether, and combinations thereof. Unsaturated chains may have at least one unsaturated bond in the cis isomer form.

The alkoxylated derivatives of the aforementioned fatty acid esters and fatty ethers (e.g., one which is ethoxylated and/or propoxylated on the remaining alcohol groups) also have antimicrobial activity as long as the total alkoxylate is kept relatively low. Exemplary alkoxylation levels are disclosed in U.S. Pat. No. 5,208,257 (Kabara). If the esters and ethers are ethoxylated, total moles of ethylene oxide may be less than 5, preferably less than 2.

The fatty acid esters or fatty ethers of polyhydric alcohols can be alkoxylated, preferably ethoxylated and/or propoxylated, by conventional techniques. Alkoxylating compounds may be selected from the group consisting of ethylene oxide, propylene oxide, and mixtures thereof, and similar oxirane compounds.

An additional class of antimicrobial lipids is 1,2 alkane diols having 5 to 12 carbon atoms in a straight or branched chain. Exemplary materials include Symdiol 68 which is a blend of 1,2 hexanediol and 1,2 octane diol available from Symrise Inc. Teterboro, N.J., and Jeecide CAP which is caprylglycol (1,2 octane diol) available from Jeen International, Fairfield, N.J.

The compositions may typically include a total amount of fatty acid esters, fatty ethers, alkoxylated fatty acid esters, alkoxylated fatty ethers, and/or 1,2 alkanediols of at least 1 weight percent (wt. %), at least 2 wt. %, greater than 5 wt. %, at least 6 wt. %, at least 7 wt. %, at least 10 wt. %, at least 15 wt. %, or at least 20 wt. %, based on the total weight of the antimicrobial film layer. In exemplary embodiments, they may be present in a total amount of no greater than 60 wt. %, no greater than 50 wt. %, no greater than 40 wt. %, or no greater than 35 wt. %, based on the total weight of the film layer. Certain compositions may be higher in concentration if they are intended to be used as a "masterbatch" for additional processing. As used herein, the term "masterbatch" refers to a concentrate that is added to a composition that is melt processed or solvent cast.

Compositions that include one or more fatty acid monoesters, fatty monoethers, hydroxyl acid esters of alcohols or alkoxylated derivatives thereof can also include a small amount of a di- or tri-fatty acid ester (i.e., a fatty acid di- or tri-ester), a di- or tri-fatty ether (i.e., a fatty di- or tri-ether), or alkoxylated derivative thereof. Such components may comprise no more than 10 wt. %, no more than 7 wt. %, no more than 6 wt. %, or no more than 5 wt. %, of the total weight of the antimicrobial component. Thus, the monoester purity of the fatty acid monoester, fatty monoethers, hydroxyl acid esters of alcohols or alkoxylated derivatives thereof should exceed 85%, 90%, or even 95%. For example, for monoesters, monoethers, or alkoxylated derivatives of glycerin, there is desirably no more than 10 wt. %, no more than 7 wt. %, no more than 6 wt. %, or no more than 5 wt. % of a diester, diether, triester, triether, or alkoxylated derivatives thereof present, based on the total weight of the antimicrobial-(monoester or monoether) components present in the composition. The triester or diester content is desirably kept low to preserve the antimicrobial efficacy of the antimicrobial component.

An additional class of antimicrobial component is a fatty alcohol ester of a hydroxyl functional carboxylic acid, e.g. of the formula:

$$R^5-O-(-C(O)-R^6-O)_nH,$$

wherein $R^5$ is the residue of a ($C_7$-$C_{14}$) saturated alkyl alcohol (for example, a ($C_7$-$C_{12}$) saturated alkyl alcohol, more preferably, a ($C_8$-$C_{12}$) saturated alkyl alcohol) or a (C8-C22) unsaturated alcohol (including polyunsaturated alcohol), $R^6$ is the residue of a hydroxycarboxylic acid wherein the hydroxycarboxylic acid has the following formula:

$$R^7(CR^8OH)_p(CH_2)_qCOOH,$$

wherein: $R^7$ and $R^8$ are each independently H or a ($C_1$-$C_8$) saturated straight, branched, or cyclic alkyl group, a ($C_6$-$C_{12}$) aryl group, or a ($C_6$-$C_{12}$) aralkyl or alkaryl group wherein the alkyl groups are saturated straight, branched, or cyclic, wherein $R^7$ and $R^8$ may be optionally substituted with one or more carboxylic acid groups; p=1 or 2; and q=0-3; and n=1, 2, or 3. The $R^6$ group may include one or more free hydroxyl groups but is free of hydroxyl groups in exemplary embodiments. Fatty alcohol esters of hydroxycarboxylic acids may be esters derived from branched or straight chain $C_8$, $C_9$, $C_{10}$, $C_{11}$, or $C_{12}$ alkyl alcohols. The hydroxyacids typically have one hydroxyl group and one carboxylic acid group.

The antimicrobial component may include a ($C_7$-$C_{14}$) saturated fatty alcohol monoester of a ($C_2$-$C_8$) hydroxycarboxylic acid (for example, a ($C_7$-$C_{12}$) saturated fatty alcohol monoester of a ($C_2$-$C_8$) hydroxycarboxylic acid, or a ($C_8$-$C_{12}$) saturated fatty alcohol monoester of a ($C_2$-$C_8$) hydroxycarboxylic acid), a ($C_8$-$C_{22}$) mono- or poly-unsaturated fatty alcohol monoester of a ($C_2$-$C_8$) hydroxycarboxylic acid, an alkoxylated derivative of either of the foregoing, or combinations thereof. The hydroxycarboxylic acid moiety can include aliphatic and/or aromatic groups. For example, fatty alcohol esters of salicylic acid are possible. As used herein, a "fatty alcohol" is an alkyl or alkylene monofunctional alcohol having an even or odd number of carbon atoms.

Exemplary fatty alcohol monoesters of hydroxycarboxylic acids include, but are not limited to, (C6-C12) fatty alcohol esters of lactic acid such as octyl lactate, 2-ethylhexyl lactate (Purasolv EHL from Purac, Lincolnshire Ill., lauryl lactate (Chrystaphyl 98 from Chemic Laboratories, Canton, Mass.), lauryl lactyl lacate, 2-ethylhexyl lactyl lactate; ($C_8$-$C_{12}$) fatty alcohol esters of glycolic acid, lactic acid, 3-hydroxybutanoic acid, mandelic acid, gluconic acid, tartaric acid, and salicylic acid.

The alkoxylated derivatives of the fatty alcohol esters of hydroxy functional carboxylic acids (e.g., one which is ethoxylated and/or propoxylated on the remaining alcohol groups) also have antimicrobial activity as long as the total alkoxylate is kept relatively low. The alkoxylation level may for example be less than 5 moles, or desirably less than 2 moles, per mole of hydroxycarboxylic acid.

The above antimicrobial components comprising an ester linkage are hydrolytically sensitive, and may be degraded by exposure to water, particularly at extreme pH (less than 4 or more than 10) or by certain bacteria that can enzymatically hydrolyze the ester to the corresponding acid and alcohol, which may be desirable in certain applications. For example, an article may be made to degrade rapidly by incorporating an antimicrobial component comprising at least one ester group. If extended persistence of the article is desired, an antimicrobial component, free of hydrolytically sensitive groups, may be used. For example, the fatty monoethers and 1,2 alkane diols are not hydrolytically sensitive under ordinary processing conditions, and are resistant to microbial attack.

Another class of antimicrobial components includes cationic amine antimicrobial compounds, which include antimicrobial protonated tertiary amines and small molecule quaternary ammonium compounds. Exemplary small molecule quaternary ammonium compounds include benzalkonium chloride and alkyl substituted derivatives thereof, di-long chain alkyl ($C_8$-$C_{18}$) quaternary ammonium compounds, cetylpyridinium halides and their derivatives, benzethonium chloride and its alkyl substituted derivatives, octenidine and compatible combinations thereof.

Cationic antiseptics and disinfectants useful as the antimicrobial component include small molecule quaternary ammonium compounds, typically comprising one or more quaternary ammonium group having attached thereto at least one $C_6$-$C_{18}$ linear or branched alkyl or aralkyl chain. Suitable compounds include those disclosed in Lea & Febiger, Chapter 13 in Block, S., *Disinfection, Sterilization and Preservation*, 4$^{th}$ ed., 1991 and may have the formula:

$$R^9R^{10}NR^{11}R^{12+}X^-$$

in which $R^9$ and $R^{10}$ are $C_1$-$C_{18}$ linear or branched alkyl, alkaryl, or aralkyl chains that may be substituted by N, O or S provided at least one $R^9$ or $R^{10}$ is a $C_8$-$C_{18}$ linear of branched alkyl, alkaryl, or aralkyl moiety that may be substituted by N, O or S, $R^{11}$ and $R^{12}$ are $C_1$-$C_6$ alkyl, phenyl, benzyl or $C_8$-$C_{12}$ alkaryl groups, or $R^{11}$ and $R^{12}$ may form a ring such as a pyridine ring with the N of the quaternary ammonium group, X is an anion, e.g. halide such as $Cl^-$ or $Br^-$ but possibly methosulfate, ethosulfate, phosphate or similar anions. Compounds within this class are: monoalkyltrimethylammonium salts, monoalkyldimethylbenzyl ammonium salts, dialkyldimethyl ammonium salts, benzethonium chloride, alkyl substituted benzethonium halides such as methylbenzethonium chloride and octenidine.

Examples of quaternary ammonium antimicrobial components are: benzalkonium halides having an alkyl chain length of $C_8$-$C_{18}$, for example $C_{12}$-$C_{16}$, or a mixture of chain lengths, e.g., benzalkonium chloride comprising 40% $C_{12}$ alkyl chains, 50% $C_{14}$ alkyl chains, and 10% C16 chains (available as Barquat MB-50 from Lonza Group Ltd., Basel, Switzerland); benzalkonium halides substituted with alkyl groups on the phenyl ring (available as Barquat 4250); dimethyldialkylammonium halides having $C_8$-$C_{18}$ alkyl groups, or mixtures of such compounds (available as Bardac 2050, 205M and 2250 from Lonza); and cetylpyridinium halides such as cetylpyridinium chloride (Cepacol Chloride available as Cepacol Chloride from Merrell Labs); benzethonium halides and alkyl substituted benzethonium halides (available as Hyamine 1622 and Hyamine 10X from Rohm and Haas).

A useful class of cationic antimicrobials is based on protonated primary, secondary, and tertiary amines. Exemplary cationic antimicrobial protonated tertiary amines have at least one $C_6$-$C_{18}$ alkyl group. Within this class are biodegradable derivatives of amino acids, as described in PCT publications WO 01/94292 (Contijoch Mestres et al.), WO 03/013454 (Urgell Beltran et al.) and WO 03/034842 (Urgell Beltran et al.), and combinations of those with sodium sorbate, potassium sorbate or sorbic acid, see WO 02/087328 (Seguer Bonaventura et al.). These cationic antimicrobial components can be degraded in the environment or on living tissue. WO 03/013454 (Urgell Beltran et al.) discusses such antimicrobial components having the formula

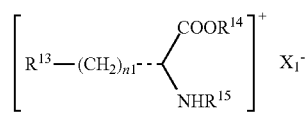

in which X may be $Br^-$, $Cl^-$ or $HSO_4^-$, $R^{15}$ may be a straight $C_8$-$C_{14}$ alkyl chain from an acid, e.g., saturated fatty hydroxy acid, $R^{14}$ is a $C_1$-$C_{18}$ straight chain or branched alkyl or an aromatic moiety; and $R^{13}$ may be —$NH_3$,

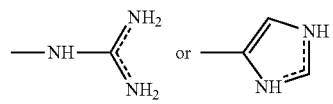

and n1 may be 0-4.

One useful member of this class of materials is lauroyl-ethylarginate (the ethyl ester and lauric acid amide of the amino acid arginine (available as Mirenat N from A&B Ingredients, Fairfield, N.J.)). Methods for producing these compositions are disclosed in WO 01/94292 (Contijoch Mestres et al.). Lauroyl ethylarginate is also approved by the FDA for use in foods and as used herein is considered a cationic antimicrobial when in its protonated form. For example, salts of Lauroyl ethyl arginate, such as those with hydrohalides such as HCl, HBr; $C_1$-$C_5$ alkylcarboxylic acids; and $C_1$-$C_5$ hydroxycarboxylic acids, may be particularly useful.

The cationic antimicrobial components are typically added to the compositions at a concentration of at least 1.0 wt. %, or at least 3 wt. %, or greater than 5.0 wt. %, or at least 6.0 wt. %, or at least 10 wt. %, or at least 20.0 wt. %, in some cases exceeding 25 wt. %. In exemplary embodiments, the concentration is less than 50 wt. %, or less than 40 wt. %, or less than 35 wt. %. Lower levels may be possible when used in combination with certain enhancers such as sorbic acid and/or its salts.

In some embodiments the antimicrobial activity may be improved by the addition of certain enhancers. The enhancer may improve the speed of microbial reduction and/or the spectrum of antimicrobial activity (Gram positive and Gram negative bacteria, virus, fungi, etc.). The enhancer component may comprise heat stable compounds of the following classes: an alpha-hydroxy acid, a beta-hydroxy acid, a chelating agent, a ($C_1$-$C_4$)alkyl carboxylic acid, a ($C_6$-$C_{12}$) aryl carboxylic acid, a ($C_6$-$C_{12}$)aralkyl carboxylic acid, a ($C_6$-$C_{12}$)alkaryl carboxylic acid, a phenolic compound, a ($C_1$-$C_{10}$)alkyl alcohol, an ether glycol, or combinations thereof. These are disclosed further in U.S. Pat. No. 8,198, 326 (Scholz) and U.S. Pat. No. 7,879,746 (Klun et al.).

In some embodiments it may be helpful to heat the film packets in order to facilitate antimicrobial migration to the surface. Heating the packet to a temperature above the glass transition temperature of the antimicrobial film layer is particularly useful.

The polymer layers, including those polymer layers that contain an antimicrobial agent, are part of a stack of polymer layers. To reduce cost and complexity of the film design, the polymer layers in the stack may be arranged in a repeating pattern such as an AB pattern (e.g. ABABAB . . . ), an ABC pattern (e.g. ABCABCABC . . . ), an ADBC pattern (e.g. ADBCADBC . . . ), or other desired patterns, with the smallest group or set of layers in the stack that repeat corresponding to a layer packet. Numerous such layer packets can be included in the polymer stack and in the multilayered film. By appropriate selection of polymer composition for the polymer layers A, B, C, etc., the layer-to-layer bond strength (sometimes also referred to herein as peel strength or peel force) can be made strong enough so that the film does not fall apart or delaminate unintentionally, e.g. while a user is manipulating it while applying it to a workpiece, but weak enough so that the user can delaminate the various layer packets from the remainder of the film without excessive force. In some cases, the layer-to-layer bond strength can be weaker along interfaces between adjacent layer packets than the bond strength for other layer interfaces within the stack, to facilitate delaminating or peeling away the layer packets, one layer packet at a time, from the remaining film.

The films can be made by coextruding all the polymer layers in the stack, with no need to laminate separately manufactured films or layers in order to construct the stack. This allows the individual peelable layer packets to be made much thinner than could otherwise be done, such that more separately peelable sheets can be included in a film of a specified overall thickness. Also, by incorporating an antimicrobial agent in selected polymer layers of the stack during the extrusion process, the life span of each peelable layer packet can be extended, and the antimicrobial capability provided by the film can be rejuvenated or renewed. Optional post-casting steps, such as orienting the multilayered extrudate by stretching in a machine direction and/or in a transverse direction, can also be employed. The films can be made without the need for any pressure sensitive adhesives, or other kinds of adhesives, in the stack of polymer layers, or at least in the polymer layers that are disposed at the interfaces between adjacent layer packets. This can simplify manufacture and also produce film surfaces, which are interior to the film in the initial manufactured product but that later become exterior surfaces as layer packets are peeled away during use, that are more pristine than can be achieved in a film made by using separate lamination steps. The polymer layers at these surfaces can comprise one or more antimicrobial agents so as to provide the film product with an antimicrobial functionality that can be renewed or refreshed simply by tearing or peeling away the outermost layer packet. If desired, two or more layer stacks may be bonded together with a PSA or other adhesive, or other suitable bonding material, to create a compound film product, whether or not the stacks themselves contain any PSA layers or other adhesive layers.

In exemplary embodiments, the layer stack and its constituent layer packets are non-porous. Furthermore, each polymer layer in the layer stack may be non-porous. Non-porous layer packets are advantageous because they provide an effective barrier to water, oils, or other contaminant-carrying liquids or substances. These barrier properties can thus ensure that layer packets that are internal to the layer stack, i.e. layer packets that have not yet been exposed to air at a given point in time in the lifetime of the product, remain substantially contaminant-free and pristine.

An exemplary multilayered polymer film of the type described herein is shown schematically in FIG. 1A. In this figure, film 110a is a multilayered polymer film configured so that successive constituent layer packets can be delaminated in continuous sheet form from the remaining film. The film 110a is made up of a stack 120a of polymer layers, and an adhesive backing layer 112 allowing the stack 120a to be attached to a workpiece of interest such as workpiece 102. Although the stack 120a is shown to be attached to the workpiece 102 using an adhesive, the stack 120a itself preferably contains no adhesives. The film 110a is typically relatively thin and flexible such that it can be applied to, and conform to, workpieces that are contoured rather than flat. For example, the film 110a may have an overall thickness of no more than about 510, or 380, or 300, or 200, or 100, or 50, or even 25 micrometers. Alternatively, in some cases it may be desirable for the film 110a to be relatively thick and inflexible or rigid.

Individual polymer layers of the stack 120a are not shown in FIG. 1A, but the individual layers are organized into repeating groups of layers referred to as layer packets, and these packets are shown and labeled as layer packets 122, 124, 126, and 128. Each layer packet is characterized by a front and back major surface, and, as described further below, at least two of the individual polymer layers are disposed between the front and back major surfaces of each layer packet. Layer packet 122 has a front major surface 122a and a back major surface 122b. Layer packet 124 has a front major surface 124a (which is in intimate contact with back major surface 122b) and a back major surface 124b. Layer packet 126 has a front major surface 126a (which is in intimate contact with back major surface 124b) and a back major surface 126b. Layer packet 128 has a front major surface 128a (which is in intimate contact with back major surface 126b) and a back major surface 128b.

The reader will understand that the terms "front", "back", and the like (e.g. frontmost, backmost) are used throughout this document for convenience in order to specify the ordering of the layers with respect to outer major surfaces of the film or stack, and should not be construed in a limiting way. Thus, even for films or packets that are intended for use such that one outer major surface is to face outwardly (front) and the other outer major surface is to face inwardly (back), either of these outer major surfaces may be considered the "front", and the other outer major surface would then be considered the "back".

Some or all of the layer packets may have the same or similar number of individual polymer layers, and the arrangement of the individual polymer layers within the layer packets may be the same or similar for some or all of the layer packets. Each layer packet includes a frontmost polymer layer, a backmost polymer layer, and in some cases one or more additional polymer layers interior to the layer packet between the frontmost and backmost polymer layers. For every pair of adjacent layer packets in the stack, attachment between the layer packets, which may be measured or quantified in terms of peel strength or peel force, is strong enough to avoid unintentional delamination, but weak enough to allow the user to delaminate the layer packets without excessive force. For example, the peel force between adjacent layer packets can be tailored to be greater than zero, e.g., at least 1 gram/inch, or at least 2 grams/inch. Peel force units of grams/inch (or grams/inch width), abbreviated g/in, are sometimes referred to as grams per linear inch, abbreviated gli. The quantity 1.0 g/in equals 0.3860886 N/m. The peel force between adjacent layer packets can be tailored to be in a range from 2 to 100 grams per inch (0.8 to 38.6 N/m).

In cases where the layer stack includes more than two different types of polymer layers, such that each layer packet includes at least three polymer layers of different composition, the stack can be designed so that the peel force is weaker at interfaces between layer packets than at other layer interfaces within the stack, such that irreversible delamination tends to occur between adjacent layer packets rather than within any of the layer packets. Regardless of how many individual polymer layers are included in each layer packet, the layer stack can also be provided with access tabs that facilitate or further facilitate delaminating the film selectively at the interfaces between layer packets rather than at interfaces within the layer packets. The interfaces between layer packets are thus sometimes also referred to herein as delamination surfaces because the film stack can be configured to preferentially delaminate at those interfaces or surfaces.

At least some of the individual polymer layers in the stack 120a, including at least one (and typically more than one) polymer layer that is interior to the film in the initial finished product, include one or more antimicrobial agents in an effective amount to limit the growth of germs or other microbes that may be deposited on the surface. To reduce cost, the antimicrobial agent(s) can be added to only some of the polymer layers, such that some of the polymer layers in the stack 120a contain an effective amount of an antimicrobial agent, while other polymer layers in the stack do not. The antimicrobial polymer layers (i.e. the polymer layers in the stack 120a that contain an effective amount of one or more antimicrobial agents) are preferably selected to be the frontmost layers in each of the layer stacks so that, for example, when a particular layer stack is exposed to air and to physical contact after the delamination and removal of a layer stack immediately above or in front of it, the particular layer stack in question presents a polymer layer to the environment that contains the antimicrobial agent(s). In order to prevent the antimicrobial agent in a given polymer layer from diminishing in concentration over time by migrating or otherwise dispersing into neighboring polymer layers, each antimicrobial polymer layer may be bounded on one or both sides with polymer layers in contact with it whose compositions are chosen to retard or resist migration of the antimicrobial agent. Such resistance to antimicrobial migration may be the result of limited compatibility (e.g., limited or low solubility) of the antimicrobial agent with the neighboring polymer layer, and/or the morphological characteristics of the neighboring polymer layer, e.g., greater crystallinity of the polymer tends to limit solubility of the antimicrobial agent.

Figure 1B:
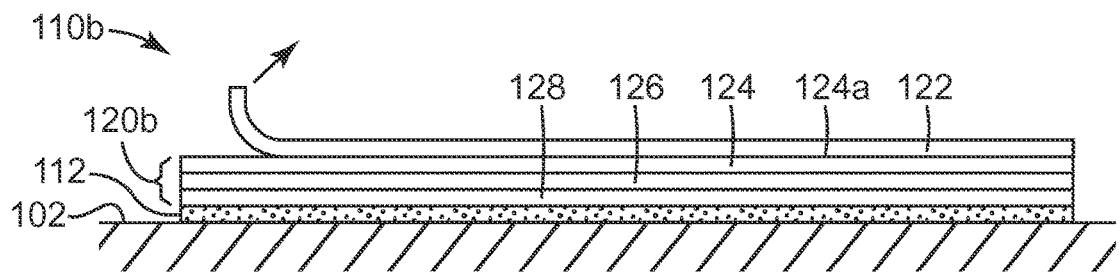
FIGS. 1B through 1E are schematic side or sectional views of the polymer film of FIG. 1A as successive layer packets are delaminated and peeled away from the film.

The delamination characteristics of the film 110a are illustrated in the sequence of FIGS. 1B through 1E. In FIG. 1B, the film 110a of FIG. 1A becomes a modified film 110b by the removal of the uppermost or outermost layer packet 122. After the antimicrobial layer of layer packet 122 has served its useful purpose, the layer packet 122 is delaminated from the remainder of the stack 120a in a continuous sheet form, such that a reduced layer stack 120b remains in place as part of the modified film 110b. Delamination occurs preferentially along a delamination surface corresponding to an interface between layer packet 122 and layer packet 124, and can be initiated by application of a tool with an adhesive contact surface, or other tacky instrument, or a knife or other sharp instrument to the edge of the film 110a. After removal of the layer packet 122, the layer packet 124 becomes the outermost layer packet of the film 110b, and the front major surface 124a of layer packet 124 becomes the front major surface of the film 110b, which is typically exposed to air or any other desired ambient environment, such as water when used underwater.

Figure 1C:
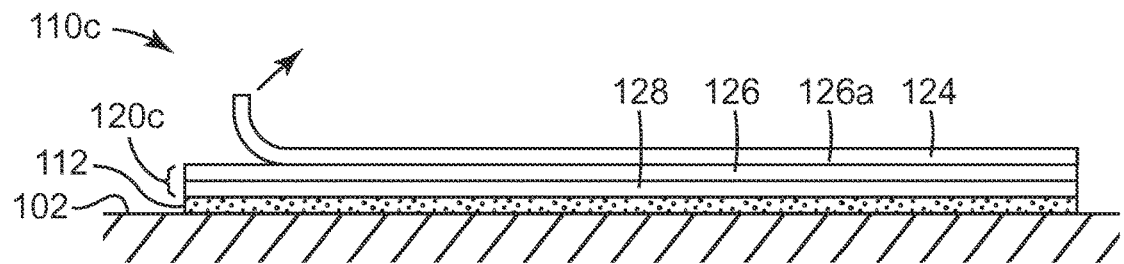

Afterwards, e.g. after the antimicrobial layer of layer packet 124 has served its useful purpose, the outermost layer packet 124 can be removed from the film 110b to form a new modified film 110c, as shown in FIG. 1C. The layer packet 124 is delaminated from the remainder of the stack 120b in a continuous sheet form, such that a reduced layer stack 120c remains in place as part of the modified film 110c. Delamination occurs preferentially along a delamination surface corresponding to an interface between layer packet 124 and layer packet 126, and can be initiated by application of a tool with an adhesive contact surface, or other tacky instrument, or a knife or other sharp instrument to the edge of the film 110b. After removal of the layer packet 124, the layer packet 126 becomes the outermost layer packet of the film 110c, and the front major surface 126a of layer packet 126 becomes the front major surface of the film 110c, which is typically exposed to air or other ambient environment. The layer packet 126 is designed such that it contains an individual antimicrobial layer (not shown) that resides at the front major surface 126a.

Figure 1D:
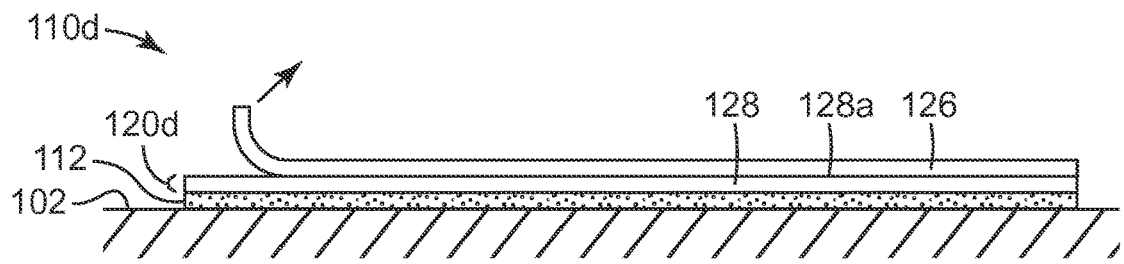

Afterwards, e.g. after the antimicrobial layer of the layer packet 126 has served its useful purpose, the outermost layer packet 126 can be removed from the film 110c to form a new modified film 110d, as shown in FIG. 1D. The layer packet 126 is delaminated from the remainder of the stack 120c in a continuous sheet form, such that a reduced layer stack 120d remains in place as part of the modified film 110d. In this case, the layer stack 120d may contain enough individual polymer layers to form only one layer packet, i.e., layer packet 128. Delamination occurs preferentially along a delamination surface corresponding to an interface between layer packet 126 and layer packet 128, and can be initiated by application of a tool with an adhesive contact surface, or other tacky instrument, or a knife or other sharp instrument to the edge of the film 110c. After removal of the layer packet 126, the layer packet 128 becomes the outermost layer packet of the film 110d, and the front major surface 128a of layer packet 128 becomes the front major surface of the film 110d, which is typically exposed to air. The layer packet 128 is designed such that it contains an individual antimicrobial layer (not shown) that resides at the front major surface 128a.

Figure 1E:
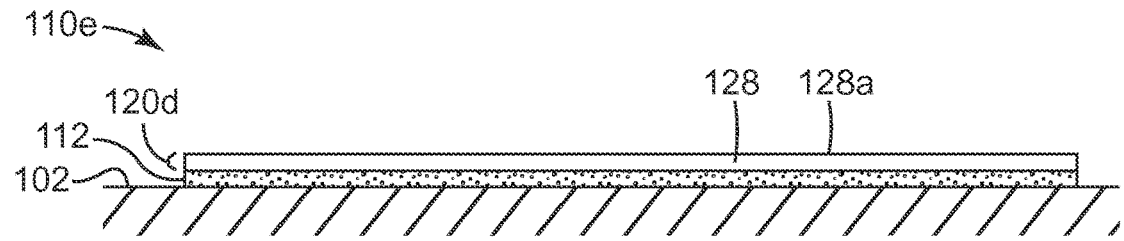

In FIG. 1E, the depicted film 110e is the same as film 110d after the complete removal of the layer packet 126. Thus, the layer stack 120d contains enough individual polymer layers to form only the layer packet 128, which remains attached to the workpiece 102 via the adhesive backing layer 112.

The reader will understand that although the original film 110a was assumed to have four layer packets, in other cases the original film may contain more than four layer packets, or, if desired, fewer than four but at least two layer packets. One benefit of making the individual polymer layers and layer packets very thin, such as can be done in a single coextrusion operation, is that many more than four layer packets, which can be removed sequentially in continuous sheet form, can be incorporated into the original film if desired.

To facilitate the sequential removal of only one sheet (layer packet) at a time and ensure delamination occurs at interfaces between layer packets, the film 110a, as well as the other multilayered polymer films disclosed herein, can be made with kiss-cut tab-like features of differing depths near the edge of the film. These features provide access to the desired delamination surfaces, and are thus also referred to herein as access tabs. Some specific embodiments are discussed further below. Furthermore, published international application WO 2012/092478 (Wu et al.) exemplifies ways in which laser radiation can be used to cut and subdivide polymeric multilayer film bodies without any substantial delamination at the laser cut edge lines, which may be useful in forming the desired tab-like features. The laser radiation is selected to have a wavelength at which at least some of the materials of the film have substantial absorption so that the absorbed electromagnetic radiation can effectively vaporize or ablate the film body along the cut line. The laser radiation is also shaped with suitable focusing optics and controlled to suitable power levels to accomplish the vaporization along a narrow cut line. The laser radiation can be rapidly scanned across the workpiece according to pre-programmed instructions, and switched on and off rapidly so that cut lines of arbitrary shape can be followed. Alternatively, mechanical blades and other cutting devices can be used instead of laser radiation to form the tab-like features.

The film 110a may be tailored for a variety of purposes and for a variety of end-use applications. As mentioned above, a benefit of making the individual polymer layers and layer packets in a single coextrusion operation, rather than in separate manufacturing operations that involve handling, alignment, and lamination of separately manufactured films, is that the front major surfaces of the layer packets may be more easily maintained in a pristine and sterile state, until they are exposed by the peeling away of the layer packets in front of a given layer packet. The antimicrobial properties of the film, and the ability to refresh or renew those properties by successively peeling away individual layer packets, makes it particularly suitable for a hospital or clinic setting in which a sterile, substantially germ-free environment is desired. However, numerous other settings may also benefit from the antimicrobial function of the film, including homes, schools, day care centers, offices, workplaces, kitchens, restaurants, food processing areas and equipment, and heavily used public areas and places such as airports, airplanes, trains, busses, and ships. Surfaces of medical devices also can benefit by covering all or part of the surfaces with the disclosed peelable antimicrobial films. Examples include coverings for stethoscopes, blood pressure cuffs, equipment control screens and knobs, overhead lights in operating rooms, operating room tables, and the like. The touch screens on portable electronic devices such as mobile phones and smart phones are also particularly suitable workpieces for the disclosed films. Due to the peel-off nature of the layer packets or sheets, the disclosed films can also serve other purposes not directly related to antimicrobial functionality, e.g., they may be useful for anti-graffiti purposes or for windshield protection for motor vehicles, aircraft, or watercraft.

In some cases, it may be important for the film 110a and its constituent components to be highly transparent across the visible spectrum, such that the presence of the film is not visually apparent to users. Such a film may be applied to visually functional workpieces, such as mirrors, windows, or electronic displays, including touch screens. In such cases, the film 110a, and all of its constituent components including its layer packets and the adhesive backing layer 112, may be substantially transparent, so that the workpiece to which it is applied does not change its appearance or its functionality regardless of how much of the original film is present on the workpiece at any given time, e.g., after one or more delaminations.

In other cases, the ability to see the workpiece through the film may not be important, or it may be undesirable. In such cases, the film 110a, and one or more of its constituent polymer layers, may be opaque. The film 110a or any of its layers may thus be tinted, dyed, pigmented, or otherwise configured to have an opaque or non-transparent characteristic. Printing (e.g. of inks or other materials) can be carried out on any exposed surface of the film or of the stack. Also, the film 110a may be rendered opaque by including an additional opaque layer (not shown), positioned between the adhesive backing layer 112 and the stack 120a. This additional opaque layer may be coextruded with the stack as a "skin layer", or it may be laminated onto the stack after formation of the stack. Such an additional layer, whether coextruded as a skin layer or laminated after formation of the stack, may also be included to provide functionalities other than or in addition to opacity. Such functionalities may include antistatic properties or rigidity (when so desired), for example.

Both in cases where the film is transparent and in cases where the film is opaque, the film 110a may be used to provide a controlled surface topography at the workpiece. For example, it may be desired to effectively provide the workpiece with a high quality smooth (low roughness) surface finish. Rather than polishing the surface of the workpiece itself, the film 110a may be applied to the workpiece to provide the needed smooth surface. In use, as the outer surface of the film becomes abraded or otherwise non-smooth, layer packets can be sequentially peeled away to restore the desired smooth surface after repeated abrasion events. In other cases, a controlled degree of roughness may be desired at the workpiece. In such cases, a controlled amount of suitably sized beads or other particles may be provided in the frontmost polymer layer of each layer packet, so that the frontmost (exposed) surface of the film has the desired amount of surface roughness. If the exposed surface should become worn down, abraded, contaminated with other materials, or the like, the desired surface roughness can be easily restored by simply peeling off the outermost layer packet to uncover the pristine surface of the immediately adjacent layer packet, which again has the desired surface roughness.

The reader will understand that the above applications are only exemplary, and that sterile films, anti-graffiti films, and controlled surface topography films are only some of a large number of possible applications of the disclosed antimicrobial multilayered polymer films.

Figure 2:
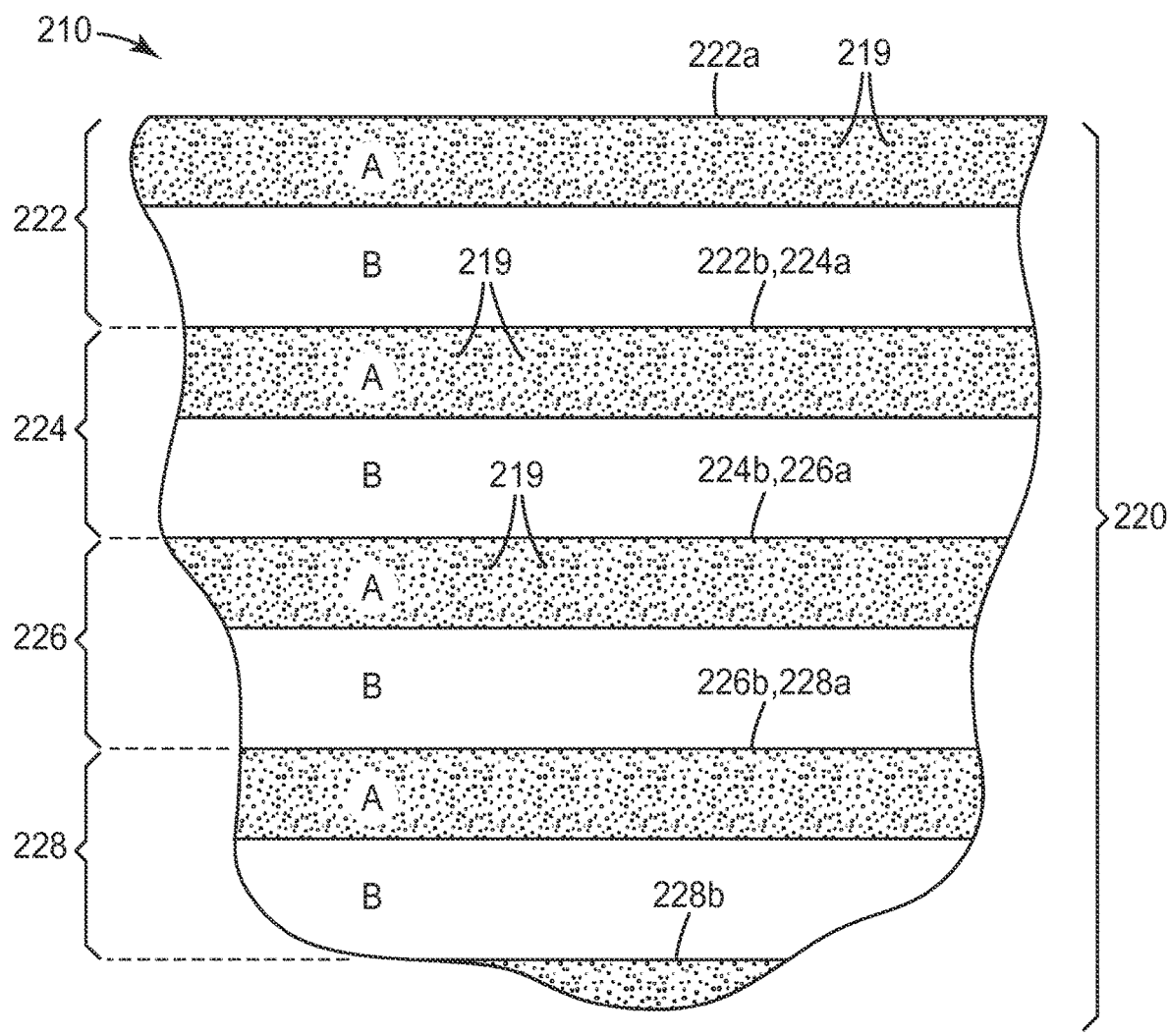
FIG. 2 is a schematic side or sectional view of a portion of a polymer film configured for successive irreversible delamination, the film being composed of a stack of polymer layers that are organized into 2-layer (A-B) layer packets.

Construction details of one possible film having the functionality shown in FIGS. 1A-1E are revealed in FIG. 2. In this figure, we see in schematic form individual polymer layers stacked together to form a stack 220 which may form all or part of a multilayered polymer film 210. In the depicted embodiment, the stack 220 is composed of only two types of polymer layers: polymer layers A, and polymer layers B, which are assumed to be composed of different polymer compositions A and B, respectively. These two different layer types are organized into repeating groups of layers A, B, A, B, and so forth, the smallest repeat unit (A, B) being referred to as a layer packet. The film 210 has at least four layer packets 222, 224, 226, and 228. Each of these layer packets is defined by a front major surface (see surfaces 222a, 224a, 226a, 228a) and a back major surface (see surfaces 222b, 224b, 226b, and 228b). The front and back major surfaces of adjacent layer packets are in intimate contact with each other. Each of the layer packets has exactly two polymer layers disposed between the front and back major surfaces: one polymer layer A, and one polymer layer B. As shown, the A layer of a given packet is the frontmost polymer layer in the packet, and the B layer is the backmost polymer layer in the packet.

An antimicrobial agent 219 is also shown in some of the layers. In particular, the antimicrobial agent 219 is dispersed in the frontmost layer A of each layer packet, but is not present in any of the other polymer layers. The polymer layers B, which bound the interior polymer layers A on both sides, may be composed of a polymer that resists migration of the antimicrobial agent 219 such that the concentration of the antimicrobial agent in the polymer layers A does not substantially diminish over time. For example, if the antimicrobial agent 219 in the polymer layers A is a fatty acid monoester, the polymer layers B can be made of a semi-crystalline polyester such as polyethylene terephthalate (PET) to resist migration of the agent. In the figure, the antimicrobial agent 219 is shown schematically in the form of particles, but it may be present in a given polymer layer in any desired form, including as a particulate or as a continuous or co-continuous phase material. The antimicrobial agent 219 may also be soluble in one, some, or all of the layers of the layer stack, including e.g. the material of the polymer layers A.

In exemplary embodiments, neither of the polymer compositions A or B are pressure sensitive adhesives (PSAs), or other types of adhesives. An "adhesive" in this regard refers to a material or layer that, when or as applied to the surfaces of different components, binds the surfaces together and resists separation, and is tacky at room temperature. Furthermore, the polymer compositions A, B are preferably coextrudable with each other, such that the entire layer stack 220 can be coextruded in a single operation rather than being made in different operations and then later laminated together with an adhesive. The polymer compositions A, B are also preferably melt processable at melt temperatures (i.e., the temperatures of the molten polymers) of 204 degrees C. (400 degrees F.) or greater. In some cases, the multilayered polymer film may be made not only by coextrusion but also by one or more stretching or orienting step, such that the polymer layers A, and/or the polymer layers B, are oriented. Such oriented layers may have a minimum level of birefringence, e.g. a birefringence of at least 0.05. The stretching, which is sometimes referred to as drawing, can be uniaxial or biaxial, and if biaxial, may be simultaneous or sequential. The act or process of stretching the multilayered film may result in all, or only some, or in some cases none of the constituent polymer layers being oriented, depending on the materials used and the process conditions such as the temperature of the film during stretch. Reference is made to U.S. Pat. No. 6,179,948 (Merrill et al.) for further discussion of known stretching or drawing techniques. For example, a two-step drawing process can be carried out in which one set of layers (e.g. the polymer layers A) substantially orients during both drawing steps, while the other set of layers (e.g. polymer layers B) only substantially orients during one drawing step. The result is a multilayered film having one set of material layers that are substantially biaxially oriented after drawing, and having another set of material layers that are substantially uniaxially oriented after drawing.

The polymer compositions A and B may be polyester-based materials, but other suitable materials can also be used. For example, the A composition may be or comprise polyesters, polyolefins, poly-alpha-olefins, polymethacrylates, polycarbonates, polycarbonate alloys, polyurethanes, aliphatic polyesters such as polylactic acid, polyhydroxybutyrate, polyhydroxysuccinate, and the like, styrenic copolymers, silicones, or copolymers and/or blends thereof, and the B composition may for example be or comprise polyesters, polyolefins, poly-alpha-olefins, polymethacrylates, polycarbonates, polycarbonate alloys, aliphatic polyesters such as polyhydroxybutyrate, polyethylene succinate, polylactic acids, and the like, styrenic copolymers, silicones, or copolymers and/or blends thereof, with the understanding that the A and B compositions are different. Copolymers may be block or random or a combination thereof.

In some cases it may be desirable to select the antimicrobial agent and the polymer composition of the antimicrobial polymer layer in each layer packet so that the antimicrobial agent migrates or "blooms" to the exposed surface of such layer after such layer is initially exposed to air, e.g. after the layer packet immediately above or in front of it is peeled away. Such blooming or migration may be achieved or enhanced by incorporating one or more suitable additives to the polymer resin of the antimicrobial layers. Blooming also may be enhanced by heating the film. Blooming can be significantly enhanced by heating the film to a temperature above the glass transition temperature of the polymer layer comprising the antimicrobial agent.

In some cases it may be desirable for the layer stack 220 to be ethylene oxide sterilization compatible. Ethylene oxide possesses the ability to penetrate paper, a number of plastics, and rubber. It is currently used to sterilize disposable syringes, hypodermic needles, prepackaged material, petri dishes, pipettes, etc. Advantages of ethylene oxide sterilization may include: it is suitable for thermolabile substances, because it can be carried out at, or only slightly above, room temperature; it does not damage moisture-sensitive substances and equipment because only a low humidity is required; it can be used for prepackaged articles, because of the great penetrating capability of ethylene oxide; and though ethylene oxide is a highly reactive compound, comparatively few materials are damaged by this process. Disadvantages of ethylene oxide sterilization may include: during sterilization, ethylene-oxide can be strongly adsorbed by some substances; and ethylene oxide can produce toxic substances, such as ethylene chlorohydrin, in some materials.

In certain embodiments it may be desirable to sterilize the film by ionizing radiation such as gamma radiation or electron beam. In such cases, the material compositions of the film are chosen to withstand this treatment. One or more antioxidants such as hindered phenols, phosphites, and hindered amines may need to be added in order to ensure polymer stability, but care should also be taken to ensure it or they are compatible with the antimicrobial agent(s).

The stack 220 is preferably configured to promote irreversible delamination at interfaces between layer packets, e.g., at major surfaces 224a/222b, 226a/224b, and so forth, rather than at interfaces within any of the layer packets. In the simple AB stack, every interface in the stack is between a polymer layer A and a polymer layer B; hence, although the layer-to-layer peel strength can be tailored by appropriate selection of the polymer A and B compositions, the peel strength at every interface will be substantially the same. The stack can nevertheless be configured in other ways to promote delamination at the desired interfaces. The stack may for example be provided with physical structures that promote the delamination.

Figure 3A:
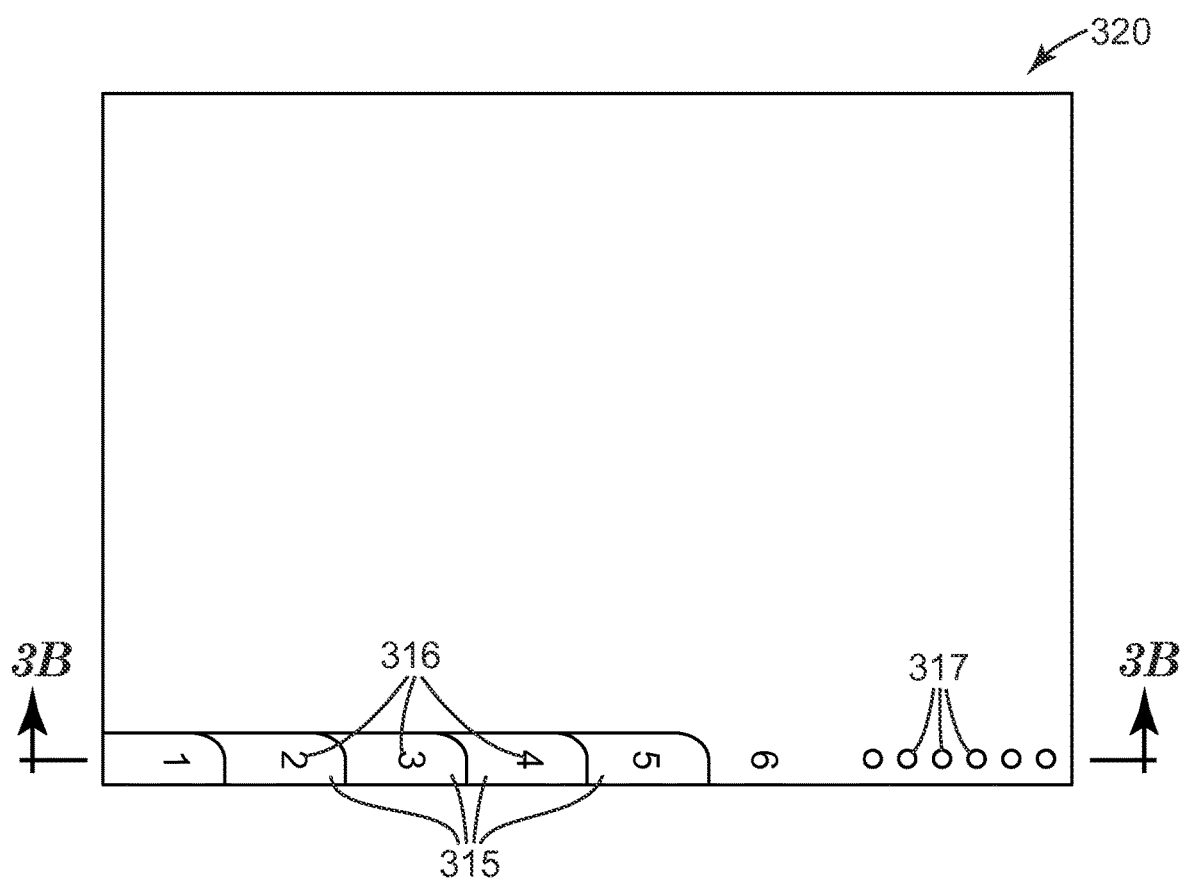
FIG. 3A is a schematic top or front plan view of a stack of coextruded polymer layers that is provided with physical structures including structures to promote delamination between layer packets.
Figure 3B:
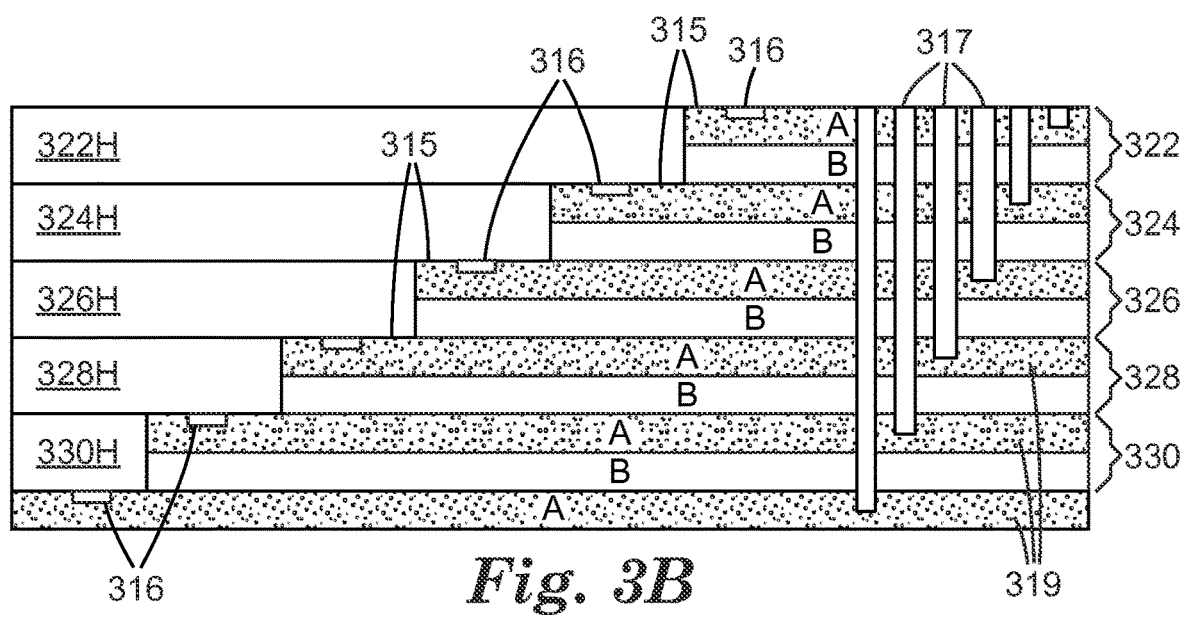
FIG. 3B is a schematic cross-sectional view along cut line 3B-3B.

An example of such physical structures is shown in the layer stack of FIGS. 3A and 3B. A stack 320 of coextruded polymer layers, which may be the same as or similar to the stack 220, is shown in schematic plan view in FIG. 3A and in schematic cross-sectional view, along cut line 3B-3B, in FIG. 3B. The stack 320 has a repeating AB polymer layer construction, with pairs of adjacent layers forming AB-type layer packets 322, 324, 326, 328, 330. The polymer layers A comprise at least one antimicrobial agent 319 dispersed therein, while the polymer layers B do not. A nested set of kiss-cut holes 322H, 324H, 326H, 328H, 330H are formed by mechanical blades, laser radiation, or any other suitable means to define access tabs 315. The kiss-cut holes and the tabs provide a stair-step-like cross sectional profile as shown in FIG. 3B. The depths of the kiss-cut holes are tailored so that the interfaces between adjacent layer packets are accessible to the user via the tabs 315. For example, a user may slide a fingernail or other sharp object along one tab towards another tab to pry the entire uppermost layer packet (which in the case of FIGS. 3A and 3B is layer packet 322) away from the remainder of the stack 320, thus exposing the polymer layer A of layer packet 324 to the environment.

Similarly, the entire film depicted in FIG. 3B, neglecting the bottom-most "A" layer, may be employed in an inverted orientation to that shown in the figure. In the inverted orientation, the layer packet 330 (with its associated hole 330H) would be the uppermost or outermost layer packet in the stack, the layer packet 322 (with its associated hole 322H) would be the bottom-most or innermost layer packet in the stack (closest to the workpiece), and the polymer "A" layers and "B" layers throughout the film (except for the omitted "A" layer) would be interchanged relative to that shown in the figure such that the layers labeled "A" in FIG. 3B would be composed of polymer B and would contain no antimicrobial agent, and the layers labeled "B" in FIG. 3B would be composed of polymer A and would contain the antimicrobial agent 319. In this orientation, rather than sliding a fingernail or other sharp object along one tab to pry the entire layer packet 322 away from the remainder of the stack, the user would grasp the tab 315 of the layer packet 330 e.g. between two fingertips and pull the tab to peel the layer packet 330 away from the remainder of the stack, in order to expose the antimicrobial layer of the next layer packet (layer packet 328) to the environment.

Labels, indicia, or other markings or features can also be provided on or in one or more layers of the stack 320. In the depicted layer stack 320, there are two types of such markings. Markings 316 are shallow holes or depressions formed in each of the polymer layers A in the regions of the access tabs 315. The markings 316 may be shaped in plan view in the form of alphanumeric characters or other symbols. In the depicted embodiment, the markings 316 are numbers that can be observed by the user as a convenient indication of how many peelable sheets remain in the stack, and on the workpiece. For example, upon delamination and removal of the frontmost layer packet 322, the marking 316 in the form of a "6" will be removed along with the packet 322, so that only the markings 316 in the form of "1", "2", "3", "4", and "5" will remain visible to the user. The markings 316 are shown as shallow holes or depressions in the polymer layers A, but they may utilize alternative designs. For example, the markings 316 may simply be alphanumeric characters or other symbols printed with ink onto the same regions of the access tabs 315.

Another type of marking shown in FIGS. 3A and 3B are the markings 317. These markings are holes of different depth through the stack 320. These holes may all open at the exposed surface of the frontmost layer and terminate at different layer packets: the shallowest hole terminates in the frontmost layer packet 322, the next deepest hole terminates in the next layer packet 324, the next deepest hole terminates in the next layer packet 326, and so forth. These holes are shown as simple round holes and are non-overlapping and spaced apart from each other along a straight line near an edge of the stack 320, but other designs can also be used. For example, the holes may have more complex outlines in plan view, e.g., in the form of alphanumeric characters. The markings 317 can also provide an indication to the user of how many peelable sheets or layer packets remain in the stack and on the workpiece. For example, six of the markings 317 are visible in the plan view of FIG. 3A, but after the outermost layer packet 322 is peeled away, only five of the markings 317 will remain, and after the layer packet 324 is peeled away, only four of the markings 317 will remain, and so forth.

Numerous alternative embodiments to that of FIGS. 3A and 3B can also be made. For example, the markings 316 may be omitted while retaining the markings 317, or the markings 317 may be omitted while retaining the markings 316, or both markings 316 and 317 may be omitted. Furthermore, holes 322H, 324H, etc. and access tabs 315 may also be omitted. If desired, the various layers can be made to have different colors by incorporating dyes, pigments, or other tinting or coloring agents, such that, for example, every other layer packet (or one or more layers thereof) is a different color, or the last layer packet or last few layer packets in the stack may be colored with such dyes, pigments, etc. to provide a visible indication to the user that no more layer packets (or only one or a few layer packets) are available for delamination.

The layer packets of FIG. 2 are 2-layer (A-B) packets. The reader will understand, however, that other layer types, e.g., polymer layers C, D, E, and so forth, may be added to the stack, such that the layer packets of the modified layer stack contain more than 2 individual polymer layers. Preferably, the additional polymer layers are added in such a way that the modified stack remains free of adhesive or PSA, and that the modified stack can be made by a single coextruding process, and that selected individual polymer layers include an antimicrobial agent, and that sheets or layer packets can be successively irreversibly delaminated from the remainder of the layer stack. One benefit of designing the layer packets to include more than 2 polymer layers is it allows for a variety of different layer-to-layer attachment strengths by appropriate selection of the polymer materials A, B, C, etc. This in turn allows us to select the A, B, C, etc. materials such that the weakest layer-to-layer attachment occurs at interfaces between layer packets, rather than at interfaces between layers within one or more of the layer packets. Such an arrangement can be used to configure the layer stack to promote irreversible delamination between layer packets rather than within the layer packets. Then, by ensuring that the frontmost polymer layer of each layer packet includes an effective amount of an antimicrobial agent, peeling away one layer packet from the stack will result in a fresh antimicrobial layer of the underlying layer packet being the new front surface of the film.

Figure 4:
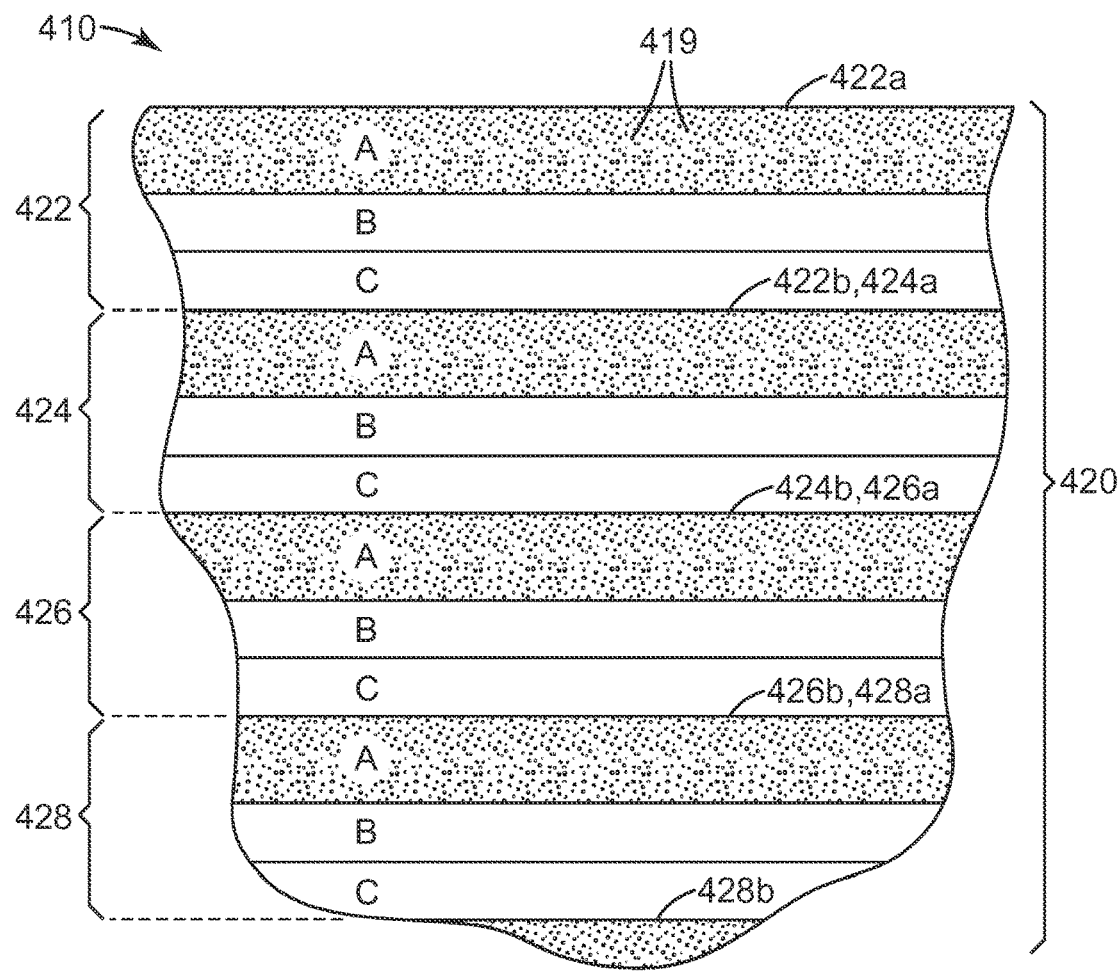
FIG. 4 is a schematic side or sectional view of a portion of a polymer film configured for successive irreversible delamination, the film being composed of a stack of polymer layers that are organized into 3-layer (A-B-C) layer packets.

Construction details of another possible film having the functionality shown in FIGS. 1A-1E are revealed in FIG. 4. In this figure, we see in schematic form individual polymer layers stacked together to form a stack 420 which may form all or part of a multilayered polymer film 410. The stack 420 may be similar to stack 220, e.g. insofar as: the polymer layers of stack 420 may be made by a single coextrusion operation, and optionally one or more stretching or orienting step; the stack 420 may contain no adhesive layers and no pressure sensitive adhesive layers; the stack 420 may include some polymer layers that have an effective amount of antimicrobial agent(s), including at least one antimicrobial layer interior to the stack, and some polymer layers that do not; the stack 420 may be configured to promote delamination between layer packets rather than along interfaces within the layer packets; and the polymer compositions of the stack 420 may be melt processable at melt temperatures of 204 degrees C. (400 degrees F.) or greater. The stack 420 however differs from stack 220 because it is composed of more than two (three) types of polymer layers: polymer layers A, polymer layers B, and polymer layers C, which are assumed to be composed of different polymer compositions A, B, and C respectively. These three different layer types are organized into repeating groups of layers A, B, C, A, B, C, and so forth, the smallest repeat unit (A, B, C) being referred to as a layer packet. The film 410 has at least four layer packets 422, 424, 426, and 428. Each of these layer packets is defined by a front major surface (see surfaces 422a, 424a, 426a, 428a) and a back major surface (see surfaces 422b, 424b, 426b, and 428b). The front and back major surfaces of adjacent layer packets are in intimate contact with each other. Each of the layer packets has exactly three polymer layers disposed between the front and back major surfaces: one polymer layer A, one polymer layer B, and one polymer layer C. As shown, the A layer of a given packet is the frontmost polymer layer in the packet, and the C layer is the backmost polymer layer in the packet, and the B layer is an interior layer (neither frontmost nor backmost) in the given packet. The stack 420 is configured such that the polymer layers A contain an effective amount of antimicrobial agent 419, while the other polymer layers (B and C) do not.

The polymer compositions B and either A or C may be polyester-based materials. In this regard, we have developed polyester and non-polyester-based material combinations which, when incorporated properly into layers B, or A or C, respectively, in the stack 420, can cause the layer packets 422, 424, etc. to preferentially delaminate along delamination surfaces corresponding to the interfaces between adjacent layer packets (refer to the dashed lines in FIG. 4). With respect to the 3-constituent layer embodiment of FIG. 4, we have found that we can make the delamination surfaces coincide with the interfaces between the polymer C layers and the polymer A layers by making the attachment of the C layers to the A layers substantially weaker than the attachment of the C layers to the B layers, and weaker than the attachment of the B layers to the A layers. This in turn can be achieved by using a blend of polypropylene copolymer with a suitable amount of another resin for the polymer composition C. For example, polymer composition C may be a miscible blend of propylene copolymer and styrenic block copolymer, or a miscible blend of propylene copolymer and an ethylene alpha olefin copolymer, or a miscible blend of propylene copolymer and an olefin block copolymer. In cases where the polymer composition C is a miscible blend of propylene copolymer and styrenic block copolymer, the polymer composition B may be an immiscible blend of copolyester and an olefin, or the polymer composition B may be an amorphous copolyester and the polymer composition A may be a semi-crystalline polyester. In some cases, the polymer composition C may be at least partially miscible with the polymer composition B, and the polymer composition B may be at least partially miscible with the polymer composition A, but the polymer composition C may not be miscible with the polymer composition A. In this regard, a given polymer composition which is an immiscible blend of polymers, such as any of polymer compositions A, B, or C, may be said to be at least partially miscible with another polymer composition if at least one component of the immiscible blend is miscible with the another polymer composition (or with at least one component of the another polymer composition if the another polymer composition is also an immiscible blend or a block copolymer, in which case "component" refers to the individual block domains of the block copolymer). As already indicated above, even though attachment between the polymer A layers and the polymer C layers may be weakest, such attachment may still be greater than zero, e.g., the peel force at the A/C interfaces may be at least 1 gram/inch, or at least 2 grams/inch.

For the purposes of the present disclosure, the terms "miscible", "miscibility", and the like, are not meant in the absolute sense of requiring that the two or more polymers in question form one homogeneous phase of spatially-constant composition, but rather, in the relative sense that there be sufficient inter-diffusion of the two or more polymers to provide significant interactions of entanglements across the interface between phases, and/or what is sometimes referred to in the literature as an "interphase" between the layers. Miscibility in this relative sense is also sometimes referred to in the polymer science literature as "compatibility" or "partial miscibility". Further, a homopolymer or random copolymer, for instance, may be said to exhibit miscibility in this sense with a block copolymer if it has such ability to interact with the domains of just one block of the block copolymer, even if the homopolymer or copolymer is entirely immiscible with the domains of the other block(s) of the block copolymer.

Differences in degrees of miscibility among the A-B, B-C, and A-C pairs of layers is not the only way to influence the relative values of peel force among the pairs of layers. For example, the at least partial miscibility of at least one component of layer A with at least one component of layer B will tend to increase the peel force of the A-B pair, due to the increase in intermolecular entanglement across the interface between these two layers. Alternatively, the presence of macromolecular orientation, or crystallinity, or both, in at least one component of at least one of layers A and B may tend to decrease the peel force of the A-B pair. This would be due to a decrease in intermolecular entanglement across the interface between the two layers which can be caused by the decreased mobility of polymer molecules which are molecularly oriented (rather than in random coil configuration), involved in structured crystallites (rather than being in an amorphous state), or both. One or more uniaxial or biaxial stretching step(s) in the film-making process can lead to molecular orientation, crystallization, or both. Thus, for layers composed at least in part of a polymer which tends to orient, crystallize, or both, under stretching, film stretching can be an alternative or a complement to altering the composition of the layers as a means of affecting the relative values of peel force among the pairs of layers. In other words, morphology (such as degree of crystalinity), as well as composition, can be used to affect the relative peel force among pairs of layers.

Thus, by designing the stack 420 so that the attachment between layer packets is weaker than attachment between layers within the layer packets, the stack 420 may thus be configured to promote delamination at the desired interfaces. However, in addition or in the alternative, the stack 420 may also be configured to promote delamination at the desired interfaces by providing the stack 420 with physical structures that promote the delamination, including in particular the access tabs and/or any of the other features discussed in connection with FIGS. 3A and/or 3B.

The layer packets of FIG. 4 are 3-layer (A-B-C) layer packets. The reader will understand, however, that the A, B, C layers may be organized differently, and/or other layer types (e.g. polymer layers D, E, and so forth) may be added to the stack, such that the layer packets contain more than 3 individual polymer layers. For example, the A, B, C layers may be arranged in an A, B, A, B, C, A, B, A, B, C, etc. arrangement, such that each layer packet is a 5-layer group (A-B-A-B-C) of polymer layers. In this case the attachment of the C layers to the A layers is again made to be substantially weaker than the attachment of the C layers to the B layers, and weaker than the attachment of the B layers to the A layers, so that delamination surfaces are formed at interfaces between the C layers and the A layers. The weak attachment of the A layers to the C layers may be greater than zero, e.g., the peel force may be at least 1 gram/inch, or at least 2 grams/inch. In this embodiment, all of the polymer layers A may be provided with one or more antimicrobial agents, while the polymer B and C layers are not. Alternatively, the antimicrobial agent(s) may be provided in only some of the polymer layers A, e.g., only the polymer layers A that are the frontmost polymer layer of each layer packet, and in none of the remaining A layers and in none of the B or C layers.

In a given peelable film, the antimicrobial layers (e.g. the polymer A layers) in the various layer packets (whether AB, or ABC, or otherwise) may contain the same antimicrobial agent, or different antimicrobial agents. In the simplest case, the antimicrobial layers within the film may all contain the same antimicrobial agent, which may be referred to as a first antimicrobial agent. In alternative embodiments, at least two of the antimicrobial layers within different layer packets of the film may contain different first and second antimicrobial agents, and in some cases each antimicrobial layer within the film may contain a distinct antimicrobial agent, i.e., each antimicrobial layer may contain an antimicrobial agent that is not contained in any of the other antimicrobial layers.

Figure 5:
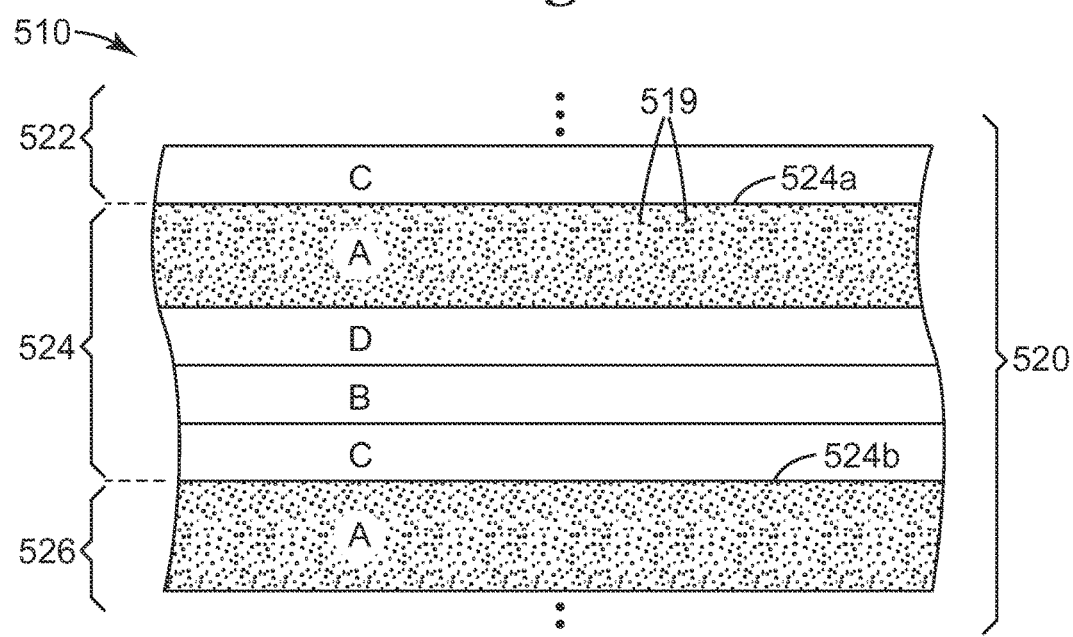
FIG. 5 is a schematic side or sectional view of a portion of a polymer film configured for successive irreversible delamination, the polymer layers in the stack being organized into 4-layer (A-D-B-C) layer packets.

In another example, polymer layers D, assumed to be made of a polymer composition D different than compositions A, B, and C, may be added to the layer stack. Such an embodiment is shown schematically in FIG. 5. In the figure, a multilayered polymer film 510, only a portion of which is shown, contains a polymer layer stack 520. The layer stack 520 is made up of four different types of polymer layers: polymer layers A, B, C, and D, composed of different polymer compositions A, B, C, and D, respectively. None of the compositions A, B, C, D are pressure sensitive adhesives (PSAs), or other types of adhesives, and these polymer compositions are preferably coextrudable with each other, such that the entire layer stack 520 can be coextruded in a single operation. The polymer compositions A, B, C, D are also preferably melt processable at melt temperatures of 204 degrees C. (400 degrees F.) or greater. Any or all of the polymer layers A, B, C, and/or D may also be oriented, and may have a birefringence of at least 0.05. The stack 520 is configured such that the polymer layers A contain an effective amount of antimicrobial agent 519, while the other polymer layers (B, C, and D) do not.

The polymer layers are organized in a repeating sequence A, D, B, C, A, D, B, C, etc., and the polymer compositions are tuned so that attachment of the C layers to the A layers is weaker than the attachment of any other adjacent layer pairs in the stack 520, analogous to the embodiment of FIG. 4. In this way, the polymer layers are organized into 4-layer layer (A-D-B-C) layer packets, and delamination preferentially occurs along delamination surfaces corresponding to the interfaces between adjacent layer packets (refer to the dashed lines in FIG. 5), i.e., to the interfaces between the polymer C layers and the polymer A layers.

Thus, by designing the stack 520 so that the attachment between layer packets is weaker than attachment between layers within the layer packets, the stack 520 may thus be configured to promote delamination at the desired interfaces. However, in addition or in the alternative, the stack 520 may also be configured to promote delamination at the desired interfaces by providing the stack 520 with physical structures that promote the delamination, including in particular the access tabs and/or any of the other features discussed in connection with FIGS. 3A and/or 3B.

Figure 6:
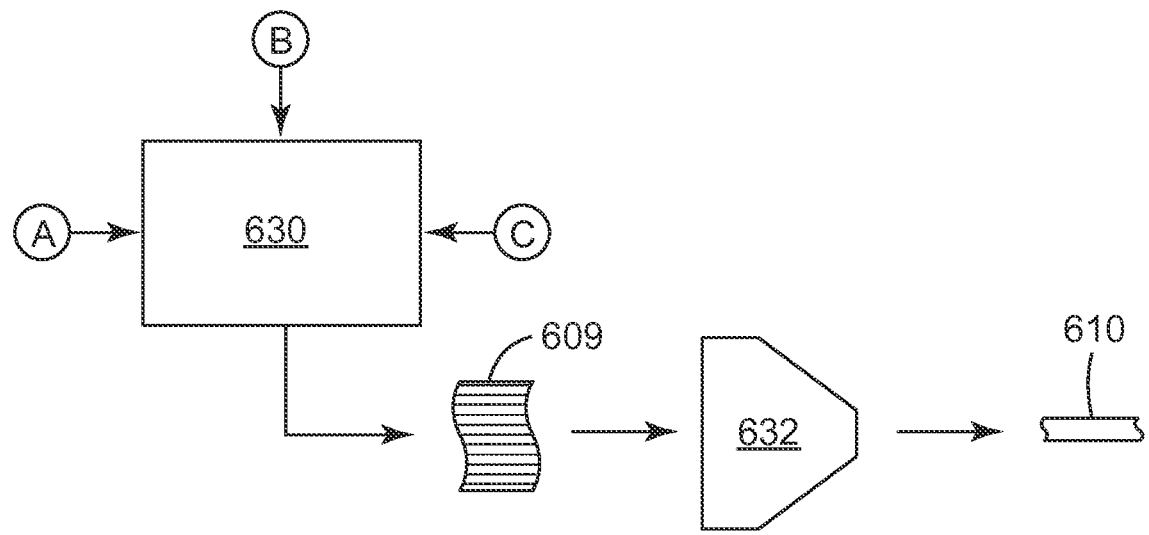
FIG. 6 is a schematic representation of a manufacturing system in which different polymer materials are coextruded to form a multilayered polymer film.
Figure 7:
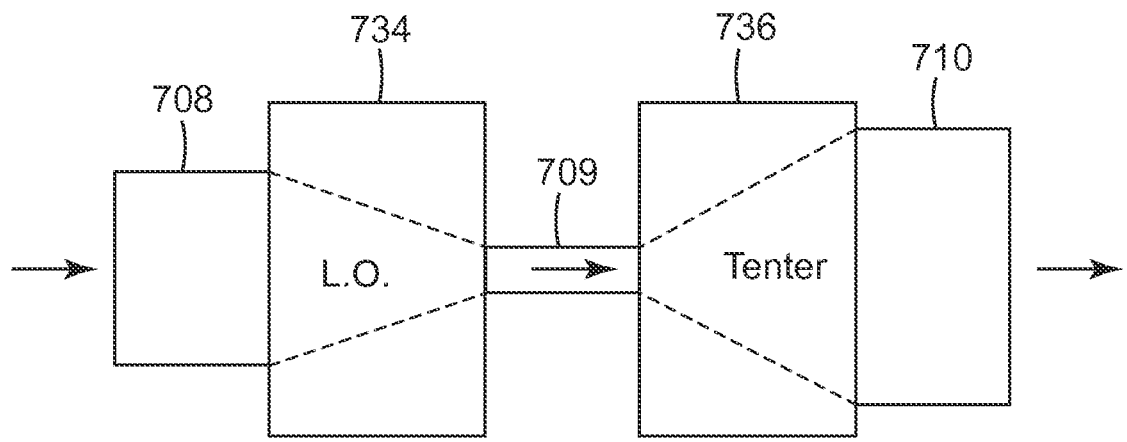
FIG. 7 is a schematic representation of film processing equipment that can be used to stretch a cast multilayered polymer film.

FIGS. 6 and 7 are schematic representations of manufacturing systems that can be used in the manufacture of the disclosed multilayered polymer films. FIG. 6 schematically depicts the coextrusion of three polymer compositions A, B, C as described elsewhere herein to form a multilayered polymer film 610. In alternative embodiments, only two polymer compositions (e.g., A, B) may be used, while in other embodiments more than three polymer compositions (e.g., A, B, C, D) may be used. The compositions can be fed via twin-screw extruders or other suitable means to a feedblock 630 that interleaves the molten polymer flow paths so that they form a multilayered extrudate 609. In cases where three polymer compositions are used, the A, B, and C polymer layers may be arranged in the extrudate 609 in the repeating pattern desired in the finished film. In some cases, the extrudate 609 may be fed into one or more layer multiplier units to form an output extrudate having a multiple (e.g., 2×, 3×, or 4×) of the number of layers in the original extrudate 609. Whether or not layer multipliers are used, the multilayered extrudate can then be fed into a film die 632, the output of which can be quenched on a casting wheel to form a cast multilayered polymer film. In some cases, the cast film may, with no additional components or features, become the finished multilayered polymer film 610. In other cases, additional layers and coatings may be applied to the cast film for additional functionality. For example, a release liner may be applied to one or both exposed major surfaces of the cast film. Also, an adhesive backing layer may be coated onto one of the exposed major surfaces of the cast film so that it can be readily applied to workpieces of interest. Physical structures, including in particular access tabs and/or other features discussed herein, may also be provided. Regardless of how many additional layers and coatings are applied, the finished multilayered polymer film 610 includes the stack of polymer layers formed by coextrusion using the feedblock 630, optional layer multiplier(s), and die 632. The layers in the stack may be being organized into layer packets tailored to irreversibly delaminate from each other as discussed elsewhere herein.

In some cases, it may be desirable to stretch or orient the multilayered cast film, whether to impart a birefringence to some or all of the individual layers in the film, or to change other material properties of some or all of the individual polymer layers. Such stretching or orientation is depicted schematically in FIG. 7. A multilayered cast film 708, which may be the same as or similar to the cast film 610 of FIG. 6, and which includes at least two, three, or more different polymer layer types arranged in the repeating pattern desired in the finished film, may be fed into one or more known film-handling devices that stretch the film in the down-web direction and/or in the cross-web direction, whether sequentially, simultaneously, or a combination thereof, to provide an oriented multilayered polymer film 710 with the delamination characteristics described herein. In FIG. 7, the multilayered cast film 708 is shown being fed first into a length orienter (L.O.) 734, which stretches the film in the down-web direction to provide a preliminary oriented film 709, followed by a tenter 736, which stretches the film in the cross-web direction, to yield the finished oriented multilayered polymer film 710. In alternative embodiments, the length orienter 734 may be omitted, or the tenter 736 may be omitted, or additional length orienter(s) and/or tenter(s) may be added. A tenter designed to be capable of stretching the film in both the downweb and crossweb directions simultaneously (not shown) may also be used, either alone or in combination with the aforementioned stretching devices. Specially designed tenters such as so-called parabolic tenters may also be used, alone or in combination with other stretching units. See for example U.S. Pat. No. 7,104,776 (Merrill et al.), U.S. Pat. No. 7,153,122 (Jackson et al.), and U.S. Pat. No. 7,153,123 (Jackson et al.). In other embodiments (not shown), the cast film may be formed into a tubular rather than flat-film configuration, and the tubular cast film may then be stretched using blown film processes or the like. The methods that can be used for stretching/orienting the cast film into a stretched film are not limited.

Similar to the discussion above in connection with FIG. 6, the finished oriented film 710 may, with no additional components or features, become the finished multilayered polymer film whose delamination properties are discussed herein. In other cases, additional layers and coatings, such as release liner(s) and adhesive backing layer(s), may be applied to the oriented film for additional functionality. Physical structures, including in particular access tabs and/or other features discussed herein, may also be provided. Regardless of how many additional layers and coatings are applied, the finished multilayered polymer film includes the stack of polymer layers formed originally by coextrusion, and then optionally oriented by stretching, the layers in the stack being organized into layer packets tailored to irreversibly delaminate from each other as discussed elsewhere herein.

As a result of the polymer layers in the layer stack being preferably compatible with simultaneous formation by coextrusion, as depicted in FIG. 6, the individually peelable layer packets can be made thinner than if they were manufactured separately and then laminated to each other. Preferably, each of the layer packets in the stack may have a thickness of no more than about 2 mils (about 50 microns). Furthermore, the layer stack may contain a total of N layer packets, and N may be at least 5 or at least 10, and the film may have an overall thickness of no more than about 15 or 20 mils (about 380 or 510 microns respectively). At least N-1 of the layer packets may have a same number M of the polymer layers, and M may be at least 2, or at least 3. The M polymer layers may be arranged in a sequence that is the same for the N-1 layer packets or for all N layer packets.

Of some importance to the ability of some of the disclosed films to preferentially delaminate at a particular type of interface that repeats throughout a stack of polymer layers is the appropriate selection of the polymer compositions of the various layer types within the stack. For such films, we may assume that the stack includes individual polymer layers organized into layer packets, each layer packet having a frontmost polymer layer, a backmost polymer layer, and at least one interior polymer layer. We may further assume that the layer stack is tailored to preferentially delaminate at delamination surfaces corresponding to interfaces between the frontmost layer and backmost layer of adjacent layer packets. In such cases, generally, suitable compositions for the frontmost layer can be selected from polyester, copolyesters, acrylics, and silicone thermoplastics. Furthermore, suitable compositions for the backmost layer can be selected from blends of olefins such as polypropylene or polyethylene blended with suitable amounts of a styrenic block copolymer, or an ethylene alpha olefin copolymer, or an olefin block copolymer. Still further, suitable compositions for the interior polymer layer can be selected from a variety of polymers and polymer blends, including but not limited to copolyesters, PMMA, co-PMMA, styrenic block copolymers, polypropylene, and silicone polyoxamides. Note that not all combinations of the aforementioned suitable compositions for the different layer types will yield the desired results, and judgment should be used to identify appropriate combinations of the polymer materials for use in the different layer types to achieve the desired functionality and delamination characteristics. For example, the frontmost layer may be or comprise a semi-crystalline polyester, the backmost layer may be or comprise a polypropylene blended with a styrenic block copolymer, an ethylene alpha olefin copolymer, or an olefin block copolymer, and the interior layer may be or comprise a copolyester. In another example, the frontmost layer may be or comprise polymethylmethacrylate (PMMA) or co-PMMA, the backmost layer may be or comprise a blend of polypropylene and a styrenic block copolymer, and the interior layer may be a blend of PMMA or co-PMMA with a styrenic block copolymer or polypropylene. In still another example, the frontmost layer may be or comprise a silicone polyoxamide, the backmost layer may be or comprise polypropylene and a styrenic block copolymer, and the interior layer may be a styrenic block copolymer.

In one approach to tailoring the attachment strength of one polymer layer to other polymer layers in the layer stack, a polymer composition composed of a blend of polypropylene and one of several copolymer resins exhibits an attachment strength to other polypropylene layers that is a function of the proportion of the blended ingredients. This approach is discussed in more detail in U.S. patent application U.S. Ser. No. 13/596,425 (Attorney Docket 69685US002), "Coextruded Polymer Film Configured For Successive Irreversible Delamination", filed on Aug. 28, 2012).

Figure 8:
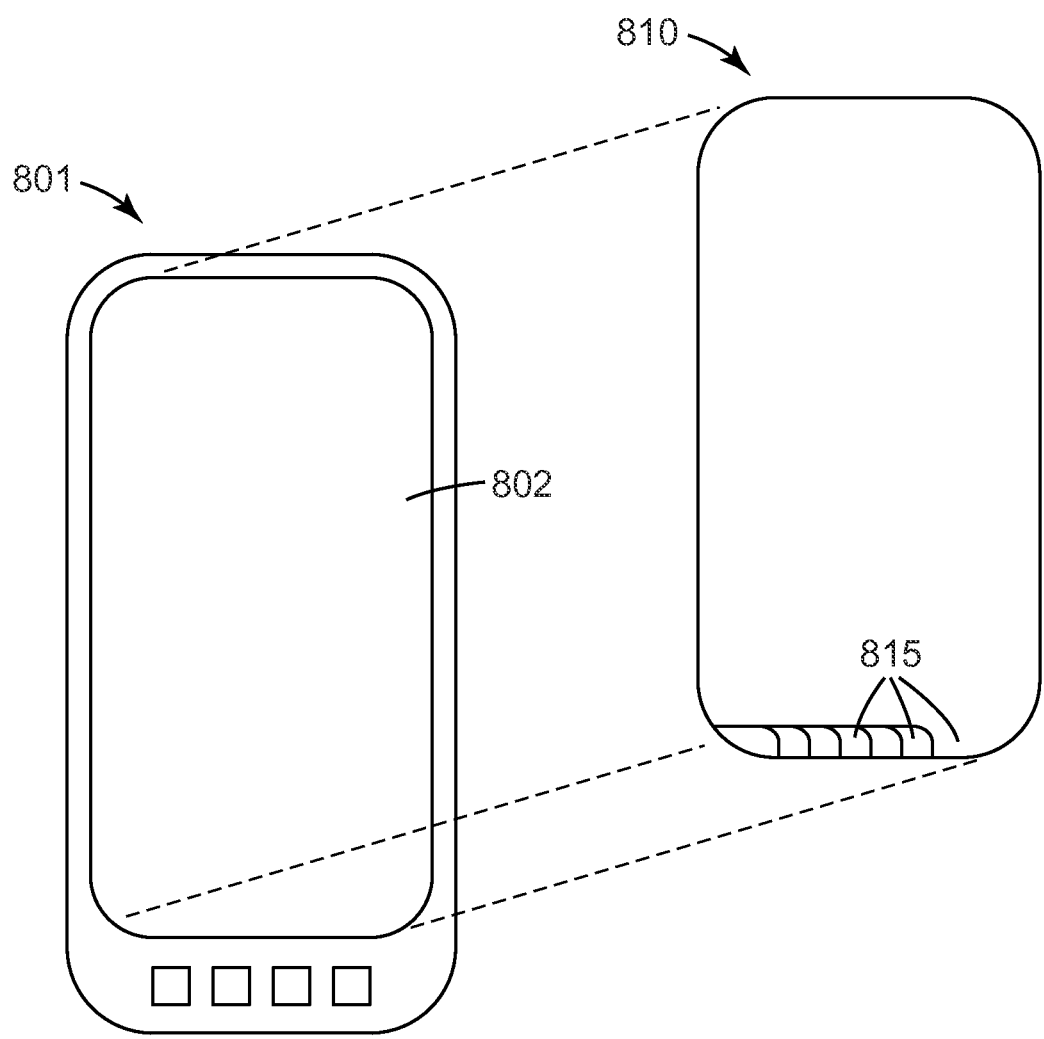
FIG. 8 is a schematic view of an electronic device in combination with a multilayered polymer film that can be applied to a display of the device as a workpiece.

Turning now to FIG. 8, we see there a schematic depiction of how any of the multilayered polymer films disclosed herein can be applied to a workpiece of interest. An electronic device 801, e.g. a portable electronic device such as a mobile phone or smart phone, has a display 802 which may also include a touch screen that covers the display and that is transparent so that the display can be viewed. The display 802 may provide information in the form of icons, alphanumeric characters, or in any other known format. A user may interact with the device 801 by single or multiple touches (e.g. touch-based gestures) on the touch screen, in response to which changing images or other changing information appears on the display 802. Alternatively, the display 802 may not include any touch screen, but may nevertheless be subject to contamination by frequent touching or other external influences. Repeated use of the device 801 may lead to the buildup and growth of bacteria and/or other microorganisms on the exposed surface of the touch screen or display 802.

To improve hygiene and reduce the likelihood that the device 801 will become a breeding ground for bacteria or other microorganisms, a successively peelable antimicrobial multilayered polymer film 810, such as any of those described herein, may be adhered to the touch screen or display 802. The film 810 may be die cut in a shape that matches the shape of the display 802, as pictured in the figure. In this application, the film 810 is preferably transparent and optically clear, with few or no significant optical defects that would interfere with observable details of the image provided by the display 802. The film 810 may also comprise an optically clear pressure sensitive adhesive layer (see e.g. layer 112 in FIGS. 1A through 1E) that functions to adhere the film 810 to the touch screen or display 802, preferably with few or no entrapped air bubbles. The film 810 may also include access tabs 815, which may be the same as or similar to access tabs 315 in FIGS. 3A-3B, to facilitate the irreversible delamination or peeling away of individual layer packets from the remainder of the film to expose a fresh antimicrobial layer of the next layer packet. The film 810 may also comprise any other structures or features described herein. Note that if access tabs are provided in the film, a minor portion of the (frontmost) antimicrobial layer of each interior layer packet (such minor portion corresponding to the regions of the respective access tab) will be exposed to contact, and contamination, by users. However, the large majority of the surface of each such interior antimicrobial layer, e.g., at least 90% or at least 95%, or at least 98% of the area of the major surface, is pristine and protected from contamination by virtue of being covered up by one or more of the other coextruded layer packets. If the tab-equipped-film is employed in an inverted orientation as discussed above in connection with FIG. 3B, such contamination may be limited somewhat, since the minor portion (e.g. 10% or less, or 5% or less, or 2% or less) of the area of the major surface which is subject to contamination is in an inverted orientation, and is thus shielded from finger touches or other direct contacts, while still being susceptible to airborne and/or waterborne contamination and the like.

EXAMPLES

The foregoing principles were used to fabricate several multilayered polymer films having the delamination and antimicrobial properties discussed herein.

In the examples, multilayered polymer films were made that were similar to the structures shown schematically in FIGS. 2 and 4.

For example, a first embodiment referred to as a Preliminary Multilayered Polymeric Film was made with a configuration similar to FIG. 4. Referring to that figure, the polymer film included a stack 420 of non-adhesive polymer layers A, B, and C organized as shown to form 15 distinct layer packets. Each of these layer packets was a 3-layer (A-B-C) layer stack, and included one frontmost major surface (422a, 424a, 426a, etc.) and one backmost major surface (422b, 424b, etc.). The 15 layer packets accounted for 45 individual polymer layers. One additional polymer layer A was added at the bottom of the resulting polymer stack, for a total of 46 individual polymer layers in the stack. In the manufactured film, these 46 layers were provided by a 46-layer feedblock. The feedblock was fed by 3 extruders—one containing polymer composition A, one containing polymer composition B, and one containing polymer composition C. One additional extruder, containing a polymer composition D, fed a skin layer block which delivered one polymer layer D to opposite sides of the 46-layer combination to form a 48-layer combination. The 48-layer combination flowed into an 8 inch (approx. 200 mm) die, and was cast onto a chilled casting wheel with electrostatic pinning. The polymer compositions A, B, and C were all distinctly different from each other but coextrudable together, and were selected so that in the finished film the attachment between the polymer layers A and C was weaker than attachment between the polymer layers A and B, and also weaker than attachment between the polymer layers B and C. For the Preliminary Multilayered Polymeric Film, the polymer composition D was the same as the polymer composition B. The polymer compositions A, B, and C were all melt processable at a melt temperature of 204 C (400 degrees F.) or greater. The extruders, die, and feedblock were heated to temperatures of 500 to 530 degrees F. (260 to 277 C) during the extrusion of the samples described in these examples.

The Preliminary Multilayered Polymeric Film, which was configured to promote irreversible delamination between layer packets rather than within the layer packets, was evaluated to assess its ability to provide a pristine surface by irreversible delamination or peeling away of layer packets after an initial contamination of its outermost surface. This film was a cast web (i.e. it was not stretched after casting), and none of its individual polymer layers contained any significant amount of antimicrobial agent.

Other film embodiments were made with an AB-type layer configuration similar to FIG. 2. In such an embodiment referred to as Example 1, two polymer layers A were interleaved with three polymer layers B to form a 5-layer stack which consisted of two AB layer stacks with one additional polymer layer B, arranged as BABAB. The polymer layers A contained an organic antimicrobial agent and the B layers contained no antimicrobial agent. The film of Example 1 was a cast web, i.e., it was not stretched after casting. One of the outer B layers served as a skin layer and could be removed (irreversibly delaminated) to expose the underlying A layer, which was an antimicrobial layer. The exposed surface of the A layer could then be contaminated (inoculated) with a microorganism, and the amount of bacteria on the surface could be measured at a time t=0 hours (i.e., immediately after inoculation) and at time t=24 hours (i.e., about 24 hours after inoculation). Comparison of the average measured viable bacteria at t=24 with the average measured viable bacteria on an untreated control sample at the same time (i.e., 24 hours after inoculation) provides a measure of the antimicrobial effectiveness (if any) of the film over the time span of 24 hours.

Another film, referred to as Example 2, was substantially similar to Example 1, except that different polymer materials were used. Thus, Example 2 was a 5-layer stack consisting of two AB layer stacks with one additional polymer layer B, arranged as BABAB. The polymer layers A contained the organic antimicrobial material and the B layers contained no antimicrobial agent. The film of Example 2 was a cast web. One of the outer B layers served as a skin layer and could be removed (irreversibly delaminated) to expose the underlying A layer, the exposed surface of which could then be inoculated and tested at time t=0 and t=24 hours to provide a measure of the antimicrobial effectiveness (if any) of the film over the time span of 24 hours, when compared to an untreated control sample at 24 hours after inoculation.

Another film, referred to as Example 3, was also made and tested. The film of Example 3 was made from a piece of the Example 1 film which was then uniaxially stretched to form a uniaxially oriented multilayered polymeric film having a 5-layer polymer stack. Similarly, a film referred to as Example 4 was made and tested. The film of Example 4 was made from a piece of the Example 2 film which was then uniaxially stretched to form a uniaxially oriented multilayered polymeric film having a 5-layer polymer stack.

Another film, referred to as Example 5, was also made and tested. The film of Example 5 was similar to the film of Example 2, except that the composition of the polymer A layers was modified. Specifically, a styrene ethylene butylene styrene (SEBS) block copolymer resin that was included in the polymer layers A of Example 2 was omitted from the corresponding polymer layers A of Example 5 to determine whether that resin had an effect on antimicrobial effectiveness.

Preliminary Multilayered Polymeric Film

This Preliminary Film had the polymer layer construction described above, with 15 layer packets each having an ABC layer configuration. The following polymer materials and extruder flow rates were used:
polymer composition A: polymethylpentene (PMP) (product code Mitsui DX845, Mitsui & Co. (USA), Inc. New York, N.Y., USA), at an extruder speed of 49 rpm and a flow rate of 10 pounds/hr (4.5 kg/hr);
polymer composition B: a polypropylene/polyethylene copolymer (product code PP8650 from Total Petrochemicals, Inc., Houston, Tex., USA), at 7.5 pounds/hr (3.4 kg/hr);
polymer composition C: a blend of a polypropylene/polyethylene copolymer (product code PP8650 from Total Petrochemicals, Inc., Houston, Tex., USA), at 80 wt % (flow rate of 6 pounds/hr (2.7 kg/hr)), and a styrene ethylene butylene styrene (SEBS) block copolymer resin (product code KRATON G1657 from Kraton Performance Polymers Inc., Houston, Tex., USA), at 20 wt % (flow rate of 1.5 pounds/hr (0.7 kg/hr)); and
polymer composition D: same as polymer composition B, at an extruder speed of 102 rpm, at a flow rate of 20 pounds/hr (9.1 kg/hr).

These materials were used to make a cast web film as described above, which is referred to here as the Preliminary Multilayered Polymeric Film, or simply the Preliminary Film. The Preliminary Film had a thickness of about 27 mils (about 675 microns). The Preliminary Film was then evaluated for its ability to provide a pristine surface after inoculation or contamination of its exposed surface with a microorganism. This can also be considered to be an evaluation of how effective the layer packets of the Preliminary Film are as barriers to the microorganism to maintain the pristine nature of the underlying or interior layer packets.

The evaluation method that was used is as follows.

Day 1:
1. Prepare 2×10 ml Tryptic Soy Broth (TSB), (BD Bacto). Inoculate one broth with *Staphylococcus aureus* (ATCC #6538), and the second broth with *Pseudomonas aeruginosa* (ATCC #15442) derived from a fresh streak plate prepared from frozen stocks less than two weeks beforehand. Incubate overnight at 37° C. for 18-24 hours before use.
2. Prepare the following:
    a. 500 ml of Letheen Broth (BD Difco) neutralizing broth.
    b. Autoclave this solution for 20 minutes at 121° C.

Day 2:
3. Cut out six 1 inch×1 inch test material samples of the Preliminary Film using a circular die cut. Three of these test samples will be inoculated with the *S. aureus* microorganism, and the remaining three test samples will be inoculated with the *P. aeruginosa* microorganism. (These two microorganisms were selected because they have different characteristic sizes and shapes, and would thus provide a good variety for purposes of evaluating barrier properties of the layer packets.) Place the test samples in appropriately labeled Petri dishes.
4. Pipette 10 µl of *S. aureus* overnight onto the exposed surface (the surface of the outermost polymer "A" layer) of three test samples. Place the inoculated test samples inside Petri dishes and place into an incubator at 37° C. for 40 minutes. This allows the inoculums to dry. Repeat this step for *P. aeruginosa* for the other three test samples.
5. Remove the petri dishes from the incubator. Using flame sterilized tweezers, remove the inoculated test samples and aseptically peel, by irreversible delamination, the outermost layer packet (whose outer surface is contaminated with the respective microorganism) off of each film. This exposes the polymer "A" layer of an underlying layer packet in the stack. Transfer the inoculated delaminated layer packet (referred to as portion 1) and the remainder of the test sample (referred to as portion 2) into separate 50 ml conical tubes (BD, Falcon) each containing 10 ml of Letheen neutralizing broth. Ensure each portion of the test sample is submerged in neutralizing broth. Place 50 ml conical tubes containing test materials into a sonicating water bath (Branson 2510) for 1 minute (used in place of a stomacher). Next, remove the test sample portions from the sonicating water bath and vortex (VWR, analog vortex mixer) the samples for 1 minute. Repeat this step for each portion of each test sample (the inoculated portion and the remainder portion) and ensure labeling accuracy.
6. Pipette 1 ml of the cells in neutralizing broth from step 5 (i.e., $\frac{1}{10}^{th}$ of the total) onto a 3M™ Petrifilm™ Aerobic Count (AC) plate. Next, prepare a dilution series ranging from 1:10 to 1:100,000 using sterile butterfield's buffer (3M, 9 ml flip tops) and plate 1 ml of each dilution onto appropriately labeled AC plates. Repeat this step for each test sample portion. Incubate the AC plates at 37° C. for 24-48 hours.

Day 3:
7. For each test sample portion, count the respective bacteria (*Staphylococcus aureus* for three of the test samples and *Pseudomonas aeruginosa* for the other three test samples) from the 1 ml pipetted broth in terms of colony-forming units (CFU), and record and analyze the data. Then multiply this initial CFU value by 10 to compute the CFU count for the respective test sample portion. If the initial CFU value is zero, then the CFU count for the sample portion is assigned the sensitivity limit of this test, i.e. a CFU count of 10. Then transform the CFU count into log units by taking the base 10 logarithm of the CFU count for the test sample portion. (Using this approach, an initial CFU value of zero yields a Log 10 CFU count of 1.0.) Determine the average and standard deviation of the respective data.

The results for the Preliminary Multilayered Polymeric Film are summarized in Table 1. For each of the two bacteria types tested, an inoculum control sample was also included and measured, and the results are also included in Table 1. In the table, "inoculum control" refers to the amount of bacteria that was pipetted onto each sample.

TABLE 1

Microorganism Count of Contaminated Preliminary Film Test Samples Before Peel (Portion 1) and After Peel (Portion 2)

| microorganism | test sample | portion | Log10 CFU | St. Dev. |
|---|---|---|---|---|
| S. aureus | (inoculum control) | (N/A) | 7.13 | 0.05 |
| S. aureus | 1 | 1 | 7.09 | 0.16 |
| S. aureus | 1 | 2 | 1.00 | 0.00 |
| S. aureus | 2 | 1 | 7.16 | 0.13 |
| S. aureus | 2 | 2 | 1.00 | 0.00 |
| S. aureus | 3 | 1 | 6.88 | 0.08 |
| S. aureus | 3 | 2 | 1.00 | 0.00 |
| P. aeruginosa | (inoculum control) | (N/A) | 7.58 | 0.08 |
| P. aeruginosa | 4 | 1 | 6.98 | 0.21 |
| P. aeruginosa | 4 | 2 | 1.00 | 0.00 |
| P. aeruginosa | 5 | 1 | 7.09 | 0.04 |
| P. aeruginosa | 5 | 2 | 1.00 | 0.00 |
| P. aeruginosa | 6 | 1 | 7.16 | 0.06 |
| P. aeruginosa | 6 | 2 | 1.10 | 0.17 |

From this table one can see that the bacteria count per sample, for both the *Staphylococcus aureus* bacteria and the *Pseudomonas aeruginosa* bacteria, was approximately on average $10^7$ CFU for the originally contaminated polymer "A" layer at the top of the Preliminary Film, but for the polymer "A" layer of the underlying layer packet (after delamination of the contaminated top layer packet) that number dropped to approximately on average $10^1$ CFU (or less), i.e., at least six orders of magnitude. This confirms the efficacy of the ABC layer packets in the polymer stack as effective barriers to bacteria migration through the film so that the underlying or interior layer packets remain pristine and substantially free of contamination.

Example 1

The film of this Example 1 was a cast film and had the 5-layer BABAB configuration discussed above. The following polymer compositions and extruder flow rates were used:
  polymer composition A: a blend of a polypropylene/ polyethylene copolymer (product code PP8650 from Total Petrochemicals, Inc., Houston, Tex., USA), at 70 wt % (flow rate of 7 pounds/hr (3.2 kg/hr)), a styrene ethylene butylene styrene (SEBS) block copolymer resin (product code KRATON G1657 from Kraton Performance Polymers Inc., Houston, Tex., USA), at 20 wt % (flow rate of 2 pounds/hr (0.5 kg/hr)); a monoglyceride with an HLB value of 4.5 to 9 (product code LAURICIDIN from Clearsynth Labs Pvt. Ltd., Mumbai, India) at 5 wt % (flow rate of 0.5 pounds/hr (0.2 kg/hr)), and polybutylene (product code DP 8911M from LyondellBasell, USA) at 5 wt % at a rate of 0.5 pounds/hr (0.2 kg/hr);
  polymer composition B (for the two outer B layers): an ionic copolyester with a formulation of: 95 mol % Dimethyl terpephthalate, 5 mol % Dimethylsodiumsulfoisophthalte on an esters basis, and 70 mol % ethylene glycol and 30 mol % neopentyl glycol on a diols basis that has a ~0.50 IV (made in similar fashion to the Polyester K described in patent application publication US 2013/0088783 (Liu et al.)), at a flow rate of 10 pounds/hr (4.6 kg/hr); and
  polymer composition B (for the interior B layer): the same composition as the outer B layers, but at a flow rate of 5 pounds/hr (2.3 kg/hr).

These materials were used to make a 5-layer cast web film as described above. This Example 1 film had a thickness of about 10 mils (about 250 microns). The Example 1 film was then tested and evaluated for antimicrobial effectiveness.

Example 2

The film of this Example 2 was also a cast film having the 5-layer BABAB configuration discussed above. The following polymer compositions and extruder flow rates were used:
  polymer composition A: a blend of a polypropylene/ polyethylene copolymer (product code PP8650 from Total Petrochemicals, Inc., Houston, Tex., USA), at 70 wt % (flow rate of 7 pounds/hr (3.2 kg/hr)), a styrene ethylene butylene styrene (SEBS) block copolymer resin (product code KRATON G1657 from Kraton Performance Polymers Inc., Houston, Tex., USA), at 20 wt % (flow rate of 2 pounds/hr (0.5 kg/hr)); a monoglyceride with an HLB value of 4.5 to 9 (product code LAURICIDIN from Clearsynth Labs Pvt. Ltd., Mumbai, India) at 5 wt % (flow rate of 0.5 pounds/hr (0.2 kg/hr)), and polybutylene (product code DP 8911M from LyondellBasell, USA) at 5 wt % at a rate of 0.5 pounds/hr (0.2 kg/hr);
  polymer composition B (for the two outer B layers): PET (product code NAN YA 1N404 from NAN YA Plastic Co., America, Lake City, S.C., USA), at a flow rate of 20 pounds/hr (9.1 kg/hr); and
  polymer composition B (for the interior B layer): the same composition as the outer B layers, but at a flow rate of 12 pounds/hr (5.4 kg/hr).

These materials were used to make a 5-layer cast web film as described above. This Example 2 film had a thickness of about 10 mils (about 250 microns). The Example 2 film was then tested and evaluated for antimicrobial effectiveness.

Example 3

As explained above, the film of this Example 3 was made by taking a piece of the (cast web) film of Example 1 and uniaxially stretching it in a KARO IV laboratory film stretcher (Bruckner Maschinenbau, Siegsdorf, Germany) to 100%×450% of original dimensions at 105 degrees C. The resulting uniaxially oriented film was 2.2 mils (56 microns) thick. This Example 3 film was then tested and evaluated for antimicrobial effectiveness.

Example 4

As explained above, the film of this Example 4 was made by taking a piece of the (cast web) film of Example 2 and uniaxially stretching it in a KARO IV laboratory film stretcher (Bruckner Maschinenbau, Siegsdorf, Germany) to 100%×450% of original dimensions at 105 degrees C. The resulting uniaxially oriented film was 2.2 mils (56 microns) thick. This Example 4 film was then tested and evaluated for antimicrobial effectiveness.

Example 5

As explained above, the film of this Example 5 was made in similar fashion to that of Example 2, except that the styrene ethylene butylene styrene (SEBS) block copolymer resin that was included in the polymer layers A of Example 2 was omitted from the corresponding polymer layers A of Example 5. Thus, the film of this Example 5 was a cast film having the 5-layer BABAB configuration discussed above. The following polymer compositions and extruder flow rates were used:

polymer composition A: a blend of a polypropylene/polyethylene copolymer (product code PP8650 from Total Petrochemicals, Inc., Houston, Tex., USA), at 90 wt % (flow rate of 9 pounds/hr (4.1 kg/hr)), a monoglyceride with an HLB value of 4.5 to 9 (product code LAURICIDIN from Clearsynth Labs Pvt. Ltd., Mumbai, India) at 5 wt % (flow rate of 0.5 pounds/hr (0.2 kg/hr)), and polybutylene (product code DP 8911M from LyondellBasell, USA) at 5 wt % at a rate of 0.5 pounds/hr (0.2 kg/hr);

polymer composition B (for the two outer B layers): PET (product code NAN YA 1N404 from NAN YA Plastic Co., America, Lake City, S.C., USA), at a flow rate of 20 pounds/hr (9.1 kg/hr); and polymer composition B (for the interior B layer): the same composition as the outer B layers, but at a flow rate of 12 pounds/hr (5.4 kg/hr).

These materials were used to make a 5-layer cast web film as described above. This Example 5 film had a thickness of about 10 mils (about 250 microns). The Example 5 film was then tested and evaluated for antimicrobial effectiveness.

Control Film

A control film was made by coextruding two polymer compositions, A and B, in an alternating repeating fashion to produce a polymer film stack having 13 total layers, arranged into 6 AB layer packets and one additional layer. No antimicrobial agent was included in any of the layers. The following polymer compositions and extruder flow rates were used:

polymer composition A: a blend of a polypropylene/polyethylene copolymer (product code PP8650 from Total Petrochemicals, Inc., Houston, Tex., USA), at a flow rate of 10 pounds/hr (4.5 kg/hr); and polymer composition B: PET resin of intrinsic viscosity 0.60, at a flow rate of 10 pounds/hr (4.5 kg/hr).

These materials were used to make a 13-layer cast web film. The cast web film had a thickness of about 20 mils (about 500 microns). The cast film, referred to as the Control Film, was used as a control sample in the testing and evaluation of the Example films.

Comparative Example

A commercially available thermal lamination film said to include an antimicrobial compound was obtained. The film is sold by Protect-All, Inc., Darien, Wis., USA, under the product designation Bio-Lam. The film is said to have an optically clear PET substrate, a thermally activated adhesive on one side of the substrate, and an antimicrobial coating composition (comprising an active silver salt) on the opposite side of the substrate. The commercially obtained film is referred to as the Comparative Example.

Test Results

The antimicrobial effectiveness of the films of Examples 1 through 5, in relation to the Control Film, was measured at an exposed polymer layer A of each film, using the method described below. The antimicrobial effectiveness of the Comparative Example was measured using the same method. The method is a modified form of the Japanese Industrial Standard Z2801, for determining the antimicrobial efficacy of hydrophobic materials.

Day 1
1. Prepare 1×10 ml Tryptic Soy Broth (TSB), (BD Bacto). Inoculate the broth with *Staphylococcus aureus* (ATCC #6538) derived from a fresh streak plate prepared from frozen stocks less than two weeks beforehand. Incubate overnight at 37° C. for 18-24 hours before use.
2. Prepare the following:
   a. 2×100 ml of distilled, deionized water.
   b. 500 ml of D/E (Dey Engley, BD Difco) neutralizing broth. The D/E broth is used as an alternative to SCDLP broth as defined in JIS Z2801.
   c. Autoclave all of these solutions for 20 minutes at 121° C.
3. Sterilize (autoclave 121° C. for 20 minutes) an appropriate number of glass bottles (50-100 ml) with caps needed for the experiment.

Day 2:
4. Cut out five 1 inch×1 inch test material samples from each film to be tested using a circular die cut. For each film, two of these test samples will be used for "time zero" (t=0) bacteria counts, and the remaining three of the test samples will be used for the 24 hour (t=24) "contact time" bacteria counts. This can be done for each bacteria or other organism being evaluated.
5. Place the test samples into sterile Petri dishes appropriately labeled for the sample, the replicate number, and the organism being evaluated.
6. Sterilize 18 mm circular cover glass (VWR) slips by autoclaving for 20 minutes at 121° C. The purpose of these cover glass slips is to increase the surface area contact between the test sample and the inoculum.
7. Prepare inoculums by centrifuging (Eppendorf centrifuge 5417C) 1 ml of each test organism at 14000 rpm for 1 minute. Remove supernatant and re-suspend cells in fresh TSB. Immediately pipette 200 µl of the inoculum into a sterile 100 ml dH$_2$O bottle. The final suspension will contain approximately 2×10$^6$ CFU/ml in 0.2% TSB.
8. Place the test samples previous labeled in Petri dishes into appropriately labeled and sterilized glass bottles. Pipette 100 µl of the cell suspension onto the test samples in the bottles. Place sterile cover glass slips over the inoculum. Screw on cap and ensure labeling accuracy.
9. Set aside the "time zero" samples. Place the other samples in an environmental incubator at 37° C., 70-80% RH for 24 hours.
10. Using flame-sterilized tweezers, remove the inoculated test samples from "time zero" samples and aseptically transfer into appropriately labeled 50 ml conical tubes (BD, Falcon) each containing 10 ml of D/E neutralizing broth. Ensure each test sample is submerged in neutralizing broth. Place 50 ml conical tubes containing test materials into a sonicating water bath (Branson 2510) for 1 minute (used in place of a stomacher). Next, remove the test samples from the sonicating water bath and vortex (VWR, analog vortex mixer) samples for 1 minute.
11. Pipette 1 ml of the cells in neutralizing broth from step 10 onto a 3M™ Petrifilm™ Aerobic Count (AC) plate. Next, prepare a dilution series ranging from 1:10 to 1:100,000 using sterile butterfield's buffer (3M, 9 ml flip tops) and plate 1 ml of each dilution onto appropriately labeled AC plates. Repeat this step for each test sample. Incubate the AC plates at 37° C. for 24-48 hours.

Day 3:

12. For each test sample, count the selected bacteria from the 1 ml pipetted broth in terms of CFUs, and record and analyze the data for each "time zero" sample. Multiply this initial CFU value by 10 to compute the CFU count for the respective sample. If the initial CFU value is zero, then the CFU count for the sample is assigned the sensitivity limit of this test, i.e. a CFU count of 10. Then transform the CFU count into log units by taking the base 10 logarithm of the CFU count for the sample. (Using this approach, an initial CFU value of zero yields a Log 10 CFU count of 1.0.) Determine the average and standard deviation of the respective data.

13. Remove the inoculated "contact time" samples at the 24 hour time point from the incubator. Harvest the inoculum of each test sample by following the same steps (10, 11) used in harvesting the "time zero" samples.

Day 4:

14. Repeat step 12 for the "contact time" test samples.

The test results for the Example 1, 2, 3, 4, and 5 films, for zero time (t=0) and 24 hours (t=24), are summarized in Table 2. Also included in the table are the results for the Control Film and the results for the Comparative Example. These films were tested for the *Staphylococcus aureus* bacteria. Several trials of each sample were made, and the average (Log 10 CFU) and standard deviation for each sample are reported in the table.

TABLE 2

Microorganism Count at Zero Time and t = 24 for Control Film, Examples 1 through 5, and Comparative Example

| microorganism | Example | time (hrs) | Log10 CFU | St. Dev. |
|---|---|---|---|---|
| S. aureus | Control Film | 0 | 5.85 | 0.04 |
| S. aureus | Control Film | 24 | 5.89 | 0.20 |
| S. aureus | 1 | 0 | 5.79 | 0.02 |
| S. aureus | 1 | 24 | 1.70 | 1.22 |
| S. aureus | 2 | 0 | 5.93 | 0.05 |
| S. aureus | 2 | 24 | 1.00 | 0.00 |
| S. aureus | 3 | 0 | 5.92 | 0.08 |
| S. aureus | 3 | 24 | 1.45 | 0.78 |
| S. aureus | 4 | 0 | 5.84 | 0.02 |
| S. aureus | 4 | 24 | 1.00 | 0.00 |
| S. aureus | 5 | 0 | 5.9 | 0.02 |
| S. aureus | 5 | 24 | 5.79 | 0.48 |
| S. aureus | Comparative Example | 0 | 5.69 | 0.19 |
| S. aureus | Comparative Example | 24 | 4.51 | 0.59 |

From this table one can see that Examples 1 through 4 exhibit bacteria counts that are orders of magnitude lower after 24 hours than that of the Control Film at the same time of t=24 hours. Comparison of Example 5 and Example 2 reveals that the presence of the styrene ethylene butylene styrene (SEBS) block copolymer resin (product code KRATON G1657 from Kraton Performance Polymers Inc.) in the antimicrobial "A" polymer layer may enhance the antimicrobial effectiveness of the film. Such a resin can also be used to tailor the peel strength between polymer layers, as discussed in the commonly assigned U.S. patent application U.S. Ser. No. 13/596,425 referenced above.

The films of Examples 1 through 5 had a high optical transparency for visible light, and a high clarity or low haze. Optical transmission and haze of Examples 1 through 4 were measured using a Haze-Gard Plus hazemeter, commercially available from BYK Instruments, Columbia, Md. The transmission measurement does not make any corrections or adjustments for Fresnel surface reflections at the front and back air interfaces of the film. The measured optical properties are provided in Table 3:

TABLE 3

Visible Light Transmission and Haze for Examples 1 through 4

| Example | Transmission (%) | Haze (%) |
|---|---|---|
| 1 | 90.5 | 4.94 |
| 2 | 91.3 | 7.64 |
| 3 | 91.8 | 1.04 |
| 4 | 91.2 | 3.86 |

The test results confirm that multilayered polymer films can be made that irreversibly delaminate preferentially at delamination surfaces corresponding to the interfaces between layer packets, and with an effective amount of an antimicrobial agent provided selectively in a frontmost layer of each layer packet, such that individual layer packets can be peeled away successively in continuous sheet form from the remaining film to provide a renewable antimicrobial functionality.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A film comprising:
a co-extruded stack of polymer layers, the polymer layers comprising a layer of a first polymer composition and a layer of a second polymer composition different from the first polymer composition organized into layer packets, each of the layer packets comprising at least one polymer layer comprising the first polymer composition and one polymer layer comprising the second polymer composition;

the stack comprising:
- a packet interface between adjacent layer packets formed by the first polymer composition of one layer packet and the second polymer composition of another layer packet, wherein the packet interface exhibits a first peel force of 1 g/inch or greater; and
- layer interfaces between adjacent layers within each layer packet, the layer interfaces exhibiting a second peel force that is greater than the first peel force,
- wherein the first composition comprises a semi-crystalline polyester and the second composition comprises a blend of olefin and styrenic block copolymer; and
- wherein at least some of the polymer layers comprise one or more organic antimicrobial agent.

2. The film of claim 1, wherein each layer packet in the stack includes at least one polymer layer that comprises the one or more organic antimicrobial agent.

3. The film of claim 2, wherein the one or more organic antimicrobial agent includes a first antimicrobial agent, and wherein the at least one polymer layer in each layer packet that comprises the one or more organic antimicrobial agent comprises the first antimicrobial agent.

4. The film of claim 2, wherein for each layer packet in the stack, the at least one polymer layer comprising the one or more organic antimicrobial agent is disposed at a front of such layer packet.

5. The film of claim 2, wherein each layer packet in the stack further includes at least one polymer layer that comprises substantially no antimicrobial agent.

6. The film of claim 2, wherein each layer packet has only one polymer layer that comprises the one or more organic antimicrobial agent.

7. The film of claim 1, wherein the at least some polymer layers comprising the one or more antimicrobial agent includes an interior polymer layer, and the interior polymer layer is bounded by polymer layers that retard or resist migration of the organic antimicrobial agent.

8. The film of claim 1, wherein the at least some polymer layers comprising the one or more organic antimicrobial agent includes a plurality of interior polymer layers, and each interior polymer layer is bounded by polymer layers that retard or resist migration of the organic antimicrobial agent.

9. The film of claim 1, wherein an attachment between any two adjacent layer packets is characterized by a peel force in a range from 2 to 100 grams per inch.

10. The film of claim 1, wherein the stack is configured with access tabs that provide access to interfaces between adjacent layer packets.

11. The film of claim 10, wherein the access tabs are defined by a set of kiss-cut holes of different depths.

12. The film of claim 1, wherein the polymer layers are arranged in a repeating AB sequence, wherein A represents the first polymer composition and B represents the second polymer composition.

13. The film of claim 1, wherein the polymer layers are arranged in a repeating ABC sequence, wherein A represents the first polymer composition and B represents the second polymer composition, and wherein C represents a third polymer composition.

14. The film of claim 1, wherein the second peel force is at least two times the first peel force.

15. The film of claim 1, wherein the polymer layers are arranged in a repeating ABC sequence, wherein A represents the first polymer composition and B represents the second polymer composition, and wherein C represents a third polymer composition.

16. The film of claim 15, wherein attachment between polymer layers A and C is weaker than attachment between polymer layers A and B, and is also weaker than attachment between polymer layers B and C.

17. The film of claim 1, wherein the organic antimicrobial agent comprises one or more antimicrobial lipid, antimicrobial essential oil, biguanide, phenolic compound, cationic amine compound, and/or organo-tin compound.

18. The film of claim 1, wherein the layer packets further comprise a third composition disposed between the first and second compositions, the third composition comprising a copolyester or styrenic block copolymer.

19. The film of claim 1, wherein at least some of the polymer layers in the co-extruded stack are oriented and have a birefringence of at least 0.05.

20. A film comprising:
- a coextruded stack of polymer layer packets;
- each polymer packet comprising a front layer comprising a first polymer composition and a back layer comprising a second polymer composition different from the first polymer composition, and an intermediate layer between the front and back layers, each polymer packet exhibiting an internal peel force between layers of the packet, and at least some polymer packets comprising an antimicrobial agent in at least one of the layers of the polymer packet;
- the stack comprising a packet interface between adjacent polymer packets, the packet interface comprising an interface of one back layer and one front layer and exhibiting an interface peel force, the interface peel force being lower than the internal peel force, wherein the packet interface exhibits a first peel force of 1 g/inch or greater; and layer interfaces between adjacent layers within each layer packet, the layer interfaces exhibiting a second peel force that is greater than the first peel force,
- wherein the first composition comprises a semi-crystalline polyester and the second composition comprises a blend of olefin and styrenic block copolymer.

21. A method, comprising:
- attaching a multilayered polymer film to a workpiece, the multilayered polymer film comprising the film of claim 1; and
- peeling away an outermost layer packet while a remainder of the stack of polymer layers remains attached to the workpiece.

22. The method of claim 21, wherein before the peeling away, an underlying layer packet is exposed to contact by users only over a minor portion of its surface corresponding to an access tab region.

* * * * *